(12) United States Patent
Arishima et al.

(10) Patent No.: US 11,518,145 B2
(45) Date of Patent: Dec. 6, 2022

(54) LAMINATE AND LAMINATED GLASS

(71) Applicant: KURARAY EUROPE GMBH, Hattersheim (DE)

(72) Inventors: Hiroyuki Arishima, Okayama (JP); Koichiro Isoue, Okayama (JP); Hirotaka Yasuda, Okayama (JP)

(73) Assignee: KURARAY EUROPE GMBH, Hattersheim (DE)

( * ) Notice: Subject to any disclaimer, the term of this patent is extended or adjusted under 35 U.S.C. 154(b) by 0 days.

(21) Appl. No.: 16/958,358

(22) PCT Filed: Dec. 27, 2018

(86) PCT No.: PCT/JP2018/048353
§ 371 (c)(1),
(2) Date: Jun. 26, 2020

(87) PCT Pub. No.: WO2019/131960
PCT Pub. Date: Jul. 4, 2019

(65) Prior Publication Data
US 2021/0060901 A1   Mar. 4, 2021

(30) Foreign Application Priority Data
Dec. 28, 2017 (JP) .............................. JP2017-254081

(51) Int. Cl.
*B32B 15/09* (2006.01)
*B32B 7/027* (2019.01)
(Continued)

(52) U.S. Cl.
CPC .............. *B32B 15/09* (2013.01); *B32B 7/027* (2019.01); *B32B 7/06* (2013.01); *B32B 15/20* (2013.01); *B32B 17/10036* (2013.01); *B32B 17/10376* (2013.01); *B32B 17/10577* (2013.01); *B32B 27/22* (2013.01); *B32B 27/306* (2013.01); *B32B 2305/34* (2013.01); *B32B 2307/302* (2013.01); *B32B 2307/538* (2013.01)

(58) Field of Classification Search
None
See application file for complete search history.

(56) References Cited

U.S. PATENT DOCUMENTS 3,601,583 A * 8/1971 Fujiwara .................. H05B 3/86
                                                       219/522
3,884,865 A * 5/1975 Fariss ............... B32B 17/10761
                                                        524/314
(Continued)

FOREIGN PATENT DOCUMENTS

DE    1917080 A1   6/2017
EP    3 076 751 A1   10/2016
(Continued)

OTHER PUBLICATIONS

International Patent Application No. PCT/JP2018/048353; Int'l Search Report; dated Mar. 19, 2019; 2 pages.
(Continued)

*Primary Examiner* — Ramsey Zacharia
(74) *Attorney, Agent, or Firm* — BakerHostetler

(57) ABSTRACT

A laminate comprising a base material film, a resin layer (1) having a detachable surface, and a heat-generating conductive layer in this order.

14 Claims, 4 Drawing Sheets

(51) Int. Cl.
*B32B 7/06* (2019.01)
*B32B 15/20* (2006.01)
*B32B 17/10* (2006.01)
*B32B 27/22* (2006.01)
*B32B 3/02* (2006.01)
*B32B 3/26* (2006.01)
*B32B 5/02* (2006.01)
*B32B 15/02* (2006.01)
*B32B 27/08* (2006.01)
*B32B 27/12* (2006.01)
*B32B 27/28* (2006.01)
*B32B 27/30* (2006.01)
*B32B 27/40* (2006.01)
*B32B 27/36* (2006.01)
*B32B 7/12* (2006.01)
*B32B 15/08* (2006.01)
*B32B 15/082* (2006.01)
*B60J 1/00* (2006.01)
*H01B 1/02* (2006.01)
*H01B 5/14* (2006.01)
*H05B 3/20* (2006.01)

(56) References Cited

U.S. PATENT DOCUMENTS

2014/0117003 A1 5/2014 Choi et al.
2015/0217547 A1 8/2015 Greb et al.
2016/0278166 A1 9/2016 Seong et al.
2016/0288459 A1 10/2016 Keller et al.

FOREIGN PATENT DOCUMENTS

| EP | 3650417 A1 | 5/2020 |
| JP | 2015-147725 A | 8/2015 |
| JP | 2017-505505 A | 2/2017 |
| JP | 2017-117785 A | 6/2017 |
| JP | 2017-212047 A | 11/2017 |

OTHER PUBLICATIONS

Extended European Search Report (EESR) dated Jul. 29, 2021 in European Application No. 18893576.1.
International Patent Application No. PCT/JP2018/048353; International Preliminary Report on Patentability, dated Mar. 19, 2019 and Written Opinion of the International Searching Authority; dated Mar. 19, 2019; 16 pp.

* cited by examiner

LAMINATE AND LAMINATED GLASS

CROSS-REFERENCE TO RELATED APPLICATIONS

This application is the National Stage of International Patent Application No. PCT/JP2018/048353, filed Dec. 27, 2018, which claims priority to Japanese Patent Application No. 2017-254081, filed on Dec. 28, 2017, the disclosures of which are incorporated herein by reference in their entirety.

TECHNICAL FIELD

The present invention relates to: a laminate which can be used as an intermediate film for laminated glasses; a heat-generating conductive layer-including film; and a laminated glass comprising the heat-generating conductive layer-including film.

BACKGROUND ART

As the method for removing frost or cloudiness on a glass in a building or a vehicle, a method in which hot air is blown onto the glass is known. For the purpose of preventing the malfunctioning of a camera or a sensor attached to a glass such as a front glass, it is needed to heat an area surrounding the camera or the sensor to remove frost or cloudiness from the area. For achieving the purpose, a method is proposed, in which the frost or cloudiness are removed by forming a conductive layer between glasses in a laminated glass and then allowing an electric current to pass through the conductive layer. As the method for forming a conductive layer, a method in which a copper foil is formed on a thin-film polyvinyl acetal resin film and then an etching treatment is carried out is known, for example (see, for example, Patent Document 1).

PRIOR ART DOCUMENT

Patent Document

Patent Document 1: JP-T-2016-539905

SUMMARY OF THE INVENTION

Problems to be Solved by the Invention

However, the method of blowing hot air onto a glass in order to remove frost or cloudiness from the glass have the problem that it takes time to achieve satisfactory front visibility, and the problem that a technique of heating air with an electric power and blowing the heated air onto the glass is inefficient particularly in electric automobiles for which combustion heat from a fuel cannot be utilized for the removal of frost or cloudiness, which directly leads to the decrease in drive distance. According to the studies made by the present inventors, it is found that, in a conductive layer formation method as mentioned above, the disconnection, detachment, deformation or the like occurs in a current-conducting structure in association with the thermal shrinkage of a thin-film polyvinyl acetal resin film, the difference in thermal expansion rate between a copper foil and the thin-film polyvinyl acetal resin film, the warpage, deformation or the like of the thin-film polyvinyl acetal resin film during a drying step in an etching process or the like. It is also found that, particularly when it is intended to provide a laminate composed of a thin-film polyvinyl acetal resin and a conductive layer to a customer, if a current-conducting structure is deformed or the like, the appearance of the laminate may be deteriorated and, in addition, a current-conducting structure may undergo the disconnection or detachment due to a mechanical action before a laminated glass comprising the laminate is formed, and that, if the disconnection or detachment occurs in the current-conducting structure, the disconnection or the detachment may become more pronounced upon the application of a mechanical action. Furthermore, the laminate is required to be free from deformation, disconnection or the like, and is also required to have satisfactory visibility and heat-generating properties after being formed into a laminated glass.

In these situations, the object of the present invention is to provide: a laminate which does not undergo the disconnection, detachment and deformation of a conductive layer and has excellent visibility and heat-generating properties after being formed into a laminated glass; a heat-generating conductive layer-including film; and a laminated glass comprising the heat-generating conductive layer-including film.

Means for Solving Problems

The present inventors have made extensive and intensive studies for solving the above-mentioned problems. As a result, it is found that a laminate comprising a base material film, a resin layer (1) having a detachable surface, and a heat-generating conductive layer in this order can solve the problems. This finding leads to the accomplishment of the present invention. The present invention includes the following items.

[1] A laminate comprising a base material film, a resin layer (1) having a detachable surface, and a heat-generating conductive layer in this order.

[2] The laminate according to [1], wherein the laminate further comprises a resin layer (2), and the base material film, the resin layer (1) having a detachable surface, the heat-generating conductive layer and the resin layer (2) are arranged in this order.

[3] The laminate according to [1] or [2], wherein the heat-generating conductive layer comprises copper.

[4] The laminate according to any one of [1] to [3], wherein the base material film comprises a polyethylene terephthalate resin.

[5] The laminate according to any one of [1] to [4], wherein the heat-generating conductive layer comprises two main bus bars and a plurality of main conductive fine wires connected to the two main bus bars.

[6] The laminate according to [5], wherein each of the main conductive fine wires is wholly or partly formed in a wavy shape and/or a zig-zag shape.

[7] The laminate according to [5] or [6], wherein the heat-generating conductive layer further comprises an auxiliary conductive fine wire that connect the main conductive fine wires, and a total of the projected cross-sectional areas of the auxiliary conductive fine wire is less than 1-time a total of the projected cross-sectional areas of the main conductive fine wires on a projected cross-sectional area of the heat-generating conductive layer which is projected from the surface of the laminate.

[8] The laminate according to any one of [5] to [7], wherein the heat-generating conductive layer further comprises an auxiliary conductive fine wire connecting the main conductive fine wires, and, when an area between the two main bus bars is divided into ten regions at positions at which the length of each of the main conductive fine wires is divided into ten equal parts, a total of the projected cross-sectional areas of the auxiliary conductive fine wire in each of regions respectively contacting with the two main bus bars is larger than that in each of the remaining eight regions.

[9] The laminate according to any one of [5] to [8], wherein the number of the main conductive fine wires each having a part having a line width of 20 μm or less is 80% or more of the number of all of the main conductive fine wires.

[10] The laminate according to any one of [1] to [9], wherein the thickness of the resin layer (1) having a detachable surface is less than 200 μm.

[11] The laminate according to any one of [1] to [10], wherein the resin layer (1) having a detachable surface contains a polyvinyl acetal resin.

[12] The laminate according to [11], wherein the resin layer (1) having a detachable surface contains a plasticizer in an amount of less than 20 parts by mass relative to 100 parts by mass of the polyvinyl acetal resin.

[13] The laminate according to [11], wherein the resin layer (1) having a detachable surface contains no plasticizer.

[14] The laminate according to any one of [11] to [13], wherein the surface roughness Rz of the resin layer (1) having a detachable surface on a heat-generating conductive layer-laminating side thereof is less than 5 μm before the lamination of the heat-generating conductive layer.

[15] The laminate according to any one of [2] to [14], wherein the resin layer (2) contains at least one resin selected from the group consisting of a polyvinyl acetal resin, an ionomer resin and an ethylene-(vinyl acetate) copolymer resin.

[16] The laminate according to any one of [2] to [15], wherein the resin layer (2) has a thickness of less than 200 μm.

[17] The laminate according to [15] or [16], wherein the resin layer (2) contains a polyvinyl acetal resin and contains a plasticizer in an amount of less than 20 parts by mass relative to 100 parts by mass of the polyvinyl acetal resin.

[18] The laminate according to [15] or [16], wherein the resin layer (2) contains no plasticizer.

[19] The laminate according to [15] or [16], wherein the resin layer (2) contains a polyvinyl acetal resin and contains a plasticizer in an amount of 20 parts by mass or more relative to 100 parts by mass of the polyvinyl acetal resin.

[20] A heat-generating conductive layer-including film which is produced by detaching the base material film from the laminate according to any one of [1] to [19].

[21] A heat-generating conductive layer-including film which is produced by detaching the base material film and the resin layer (1) having a detachable surface from the laminate according to any one of [1] to [19].

[22] A laminated glass comprising:
  at least two glasses; and
  the heat-generating conductive layer-including film according to [20], which is intercalated between the at least two glasses.

[23] A laminated glass comprising:
  at least two glasses, and
  the heat-generating conductive layer-including film according to [21], and a resin layer (4) containing at least one resin selected from the group consisting of a polyvinyl acetal resin, an ionomer resin and an ethylene-(vinyl acetate) copolymer resin, both of which are intercalated between the at least two glasses,
  wherein the resin layer (4) is arranged on a surface contacting with the heat-generating conductive layer.

[24] The laminated glass according to [22] or [23], wherein the distance between the heat-generating conductive layer and an inside surface of at least one of the glasses is less than 200 μm.

[25] The laminated glass according to any one of [22] to [24], wherein a total thickness of the layer containing a polyvinyl acetal resin is less than 1 mm.

Effects of the Invention

The laminate of the present invention does not undergo the disconnection, detachment and deformation of the conductive layer, and has excellent visibility and heat-generating properties after being formed into a laminated glass.

EMBODIMENTS OF THE INVENTION

[Laminate]

Figure 1:
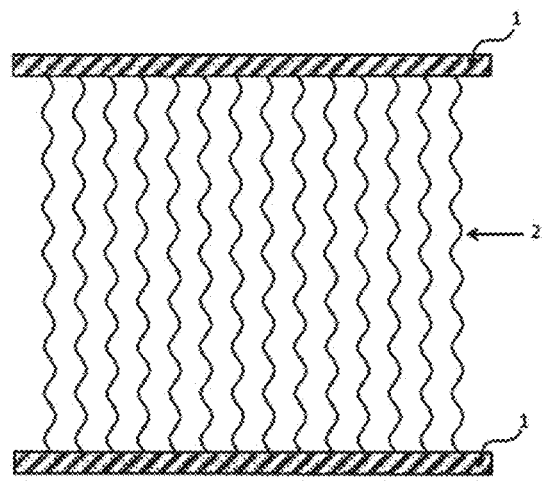
FIG. 1 is a schematic illustration showing one example of the current-conducting structure of the heat-generating conductive layer in the laminate of the present invention.

The laminate of the present invention comprises a base material film, a resin layer (1) having a detachable surface, and a heat-generating conductive layer in this order. In the description, a resin layer (1) having a detachable surface is also simply referred to as a "resin layer (1)" and a heat-generating conductive layer is also simply referred to as a "conductive layer", hereinafter.

The laminate of the present invention can be produced by, for example, laminating a base material film, a resin layer (1), a metal foil, and a base material film in this order, then detaching the base material film placed on the metal foil side of the laminate, and then forming a heat-generating conductive layer from the metal foil by a technique such as photolithography. The laminate of the present invention has the base material film at the time of the formation of the conductive layer. Therefore, the disconnection, detachment, deformation or the like of the current-conducting structure of the conductive layer, which may be caused as the result of, for example, the thermal shrinkage of a resin constituting the resin layer (1), the difference in thermal expansion rate between the metal foil and the resin layer (1), or the warpage, deformation or the like of the resin layer (1) during a drying step in an etching treatment, can be prevented or reduced effectively. Therefore, even when a mechanical action is generated in the laminate, the laminate does not undergo disconnection, detachment, deformation or the like, and can have excellent heat-generating properties. Furthermore, in the laminate of the present invention, even during the formation of a laminated glass, the disconnection, detachment, deformation or the like of the current-conducting structure of the conductive layer can be prevented or reduced effectively. Therefore, the formed laminated glass does not undergo disconnection, detachment, deformation or the like, either, and also has excellent heat-generating properties. Furthermore, the laminated glass also has a small haze value and therefore has excellent visibility. The term "visibility" as used herein refers to the viewability of a space on the rear side of a surface of a laminated glass through the laminated glass when the surface of the laminated glass is observed with naked eyes.

<Base Material Film>

The laminate of the present invention comprises a base material film. As the base material film, any one of films made from various resins can be used. Examples of the resins include: a polyester resin such as polyethylene terephthalate (PET) and polyethylene naphthalate (PEN); polycarbonate; polymethyl methacrylate; polyacrylate; a polyolefin resin such as polypropylene and polyethylene; polyphenylene sulfide (PPS); and a fluorinated resin such as polyvinyl fluoride and an ethylene-tetrafluoroethylene copolymer (ETFE). These resins may be used singly, or two or more of them may be used in combination. Among these films, a film made from a polyester resin is preferred because of the excellent strength, dimensional stability and thermal stability thereof, and a film made from a polyethylene terephthalate (PET) resin or a polyethylene naphthalate (PEN) resin is more preferred because of the inexpensiveness thereof. The polyester resin may be a copolymer. In this case, examples of the copolymerization components include: a diol component such as propylene glycol, diethylene glycol, neopentyl glycol and cyclohexane dimethanol; and a dicarboxylic acid component such as isophthalic acid, adipic acid, azelaic acid, sebacic acid and an ester-forming derivative thereof.

The thickness of the base material film is preferably 20 to 500 μm, more preferably 30 to 300 μm, still more preferably 50 to 150 μm, from the viewpoint of the retention of the resin layer and the heat-generating conductive layer, the easiness of a detachment procedure, the rationality of the roll thickness and the like.

On the surface of the base material film, a retention layer may be formed. As the retention layer, a two-part curable urethane adhesive agent or a two-part curable epoxy adhesive agent can be used for example. From the viewpoint of the adhesivity to the resin layer (1) or the like, the thickness of the retention layer is preferably 1 to 100 μm. In the case where it is intended to detach between the resin layer (1) and the retention layer, the detachment is not easy. Therefore, when detachment occurs between the retention layer and the base material film or cohesive failure occurs in any one of the layers, it is preferred that the base material film does not have the retention layer.

<Resin Layer (1) Having Detachable Surface>

The resin layer (1) may have a detachable surface on a surface contacting with the heat-generating conductive layer, or may have the detachable surface on a surface contacting with the base material film. By detaching only the base material film from the laminate of the present invention, or by detaching the base material film and the resin layer (1) having a detachable surface from the laminate of the present invention, the heat-generating conductive layer-including film of the present invention mentioned below can be produced.

Examples of the resin constituting the resin layer (1) include: a polyvinyl acetal resin produced by the acetalization of polyvinyl alcohol or a polyvinyl alcohol-based resin such as a vinyl alcohol copolymer; an ionomer resin; a (meth)acrylate-based resin; and a silicone-based resin. Among these resins, a polyvinyl acetal resin is preferred from the viewpoint of obtaining a heat-generating conductive layer-including film from which only the base material film is detached, and a (meth)acrylate-based resin is preferred from the viewpoint of obtaining a heat-generating conductive layer-including film from which the base material film and the resin layer (1) are detached. These resins may be used singly, or two or more of them may be used in combination.

In the case where the resin layer (1) contains a polyvinyl acetal resin, a single polyvinyl acetal resin may be contained, or two or more polyvinyl acetal resins that are different from each other with respect to at least one item selected from the viscosity average polymerization degree, the acetalization degree, the acetyl group amount, the hydroxyl group amount, the ethylene content, the molecular weight of an aldehyde to be used for the acetalization and the chain length may be contained. In the case where the resin layer (1) contains different two or more polyvinyl acetal resins, it is preferred to use a mixture of two or more polyvinyl acetal resins that are different from each other with respect to at least one item selected from the viscosity average polymerization degree, the acetalization degree, the acetyl group amount and the hydroxyl group amount, from the viewpoint of the easiness of melt molding, from the viewpoint of suppressing the disconnection, detachment or deformation during the formation of the conductive layer or during the production of a laminated glass, and from the viewpoint of preventing the displacement of the like of glasses during the actual use of the laminated glass.

The polyvinyl acetal resin can be produced by, for example, the following method. Firstly, an aqueous solution of a polyvinyl alcohol or a vinyl alcohol copolymer at a concentration of 3 to 30% by mass is retained in a temperature ranging from 80 to 100° C. and is then cooled gradually over 10 to 60 minutes. When the temperature is lowered to −10 to 30° C., an aldehyde (or a keto compound) and an acid catalyst are added to the solution, and then an acetalization reaction is carried out for 30 to 300 minutes while keeping the temperature constant. Subsequently, the reaction solution is heated to a temperature of 20 to 80° C. over 30 to 200 minutes, and then the reaction solution is retained at this temperature for 30 to 300 minutes. Subsequently, the reaction solution is optionally filtrated, and is then neutralized by adding a neutralizing agent such as an alkali to the reaction solution, and then the resultant resin is filtrated out, is then washed with water, and is then dried. In this manner, a polyvinyl acetal resin is produced.

The acid catalyst to be used in the acetalization reaction may be either one of an organic acid and an inorganic acid. Examples of the acid catalyst include acetic acid, paratoluenesulfonic acid, hydrochloric acid, sulfuric acid and nitric acid. Among these acid catalysts, from the viewpoint of acidic strength and easiness of the removal during washing, hydrochloric acid, sulfuric acid and nitric acid are preferred.

The polyvinyl alcohol that is a raw material for the polyvinyl acetal resin can be produced by a conventional publicly-known technique, i.e., by polymerizing a carboxylic acid vinyl ester compound such as vinyl acetate and then saponifying the resultant polymer. As the method for polymerizing the carboxylic acid vinyl ester compound, a conventional publicly-known method can be employed, such as a solution polymerization method, a block polymerization method, a suspension polymerization method and an emulsion polymerization method. A polymerization initiator can be selected appropriately among an azo-type initiator, a peroxide-type initiator, a redox initiator and others depending on the type of the polymerization method to be employed. As the saponification reaction, an alcoholysis reaction, a hydrolysis reaction or the like using a conventional publicly-known alkaline or acid catalyst can be employed.

The vinyl alcohol copolymer that is a raw material for the polyvinyl acetal resin can be produced by the saponification of a copolymer of a vinyl ester and another monomer. Examples of the another monomer include: an α-olefin such as ethylene, propylene, n-butene and isobutylene; acrylic acid or a salt thereof an acrylic acid ester such as methyl acrylate, ethyl acrylate, n-propyl acrylate, i-propyl acrylate, n-butyl acrylate, i-butyl acrylate, t-butyl acrylate, 2-ethylhexyl acrylate, dodecyl acrylate and octadecyl acrylate; methacrylic acid or a salt thereof a methacrylic acid ester such as methyl methacrylate, ethyl methacrylate, n-propyl methacrylate, i-propyl methacrylate, n-butyl methacrylate, i-butyl methacrylate, t-butyl methacrylate, 2-ethylhexyl methacrylate, dodecyl methacrylate and octadecyl methacrylate; acrylamide; an acrylamide derivative such as N-methylacrylamide, N-ethylacrylamide, N,N-dimethylacrylamide, diacetoneacrylamide, acrylamide propanesulfonic acid or a salt thereof, acrylamide propyldimethylamine or a salt or quaternary salt thereof, and N-methylolacrylamide or a derivative thereof, methacrylamide; a methacrylamide derivative such as N-methylmethacrylamide, N-ethylmethacrylamide, methacrylamide propanesulfonic acid or a salt thereof, methacryamide propyldimethylamine or a salt or quaternary salt thereof, and N-methylolmethacrylamide or a derivative thereof a vinyl ether such as methyl vinyl ether, ethyl vinyl ether, n-propyl vinyl ether, i-propyl vinyl ether, n-butyl vinyl ether, i-butyl vinyl ether, t-butyl vinyl ether, dodecyl vinyl ether and stearyl vinyl ether; a nitrile such as acrylonitrile and methacrylonitrile; a vinyl halide such as vinyl chloride and vinyl fluoride; a vinylidene halide such as vinylidene chloride and vinylidene fluoride; an allyl compound such as allyl acetate and ally chloride; an unsaturated dicarboxylic acid such as maleic acid, itaconic acid and fumaric acid, or a salt, ester or anhydride thereof a vinylsilyl compound such as vinyltrimethoxysilane; and isopropenyl acetate. These another monomers may be used singly, or two or more of them may be used in combination. Among these monomers, ethylene is preferred as the another monomer.

From the viewpoint of obtaining a polyvinyl acetal resin having an excellent penetration resistance more readily when formed into a laminated glass, the aldehyde (or keto compound) to be used in the production of the polyvinyl acetal resin preferably has a linear, branched or cyclic form, more preferably a linear or branched form, having 2 to 10 carbon atoms. As a result, a corresponding linear or branched acetal group can be obtained. The polyvinyl acetal resin to be used in the present invention may also be produced by the acetalization of a polyvinyl alcohol or a vinyl alcohol copolymer with a mixture of a plurality of aldehydes (or keto compounds). Each of the polyvinyl alcohol and the vinyl alcohol copolymer may comprise a single component, or may comprise a mixture of components that are different from each other with respect to the viscosity average polymerization degree, hydrolysis degree or the like.

The polyvinyl acetal resin to be used in the resin layer (1) is preferably produced by the reaction between at least one polyvinyl alcohol and at least one aldehyde having 1 to 10 carbon atoms. If the number of carbon atoms in the aldehyde is more than 12, the acetalization reactivity may be deteriorated, and the blocking of the polyvinyl acetal resin may occur during the reaction, resulting in the difficulty of the production of the polyvinyl acetal resin.

Examples of the aldehyde to be used in the acetalization reaction include aliphatic, aromatic and alicyclic aldehydes, such as formaldehyde, acetaldehyde, propionaldehyde, n-butyraldehyde, isobutyraldehyde, valeraldehyde, isovaleraldehyde, n-hexylaldehyde, 2-ethylbutyraldehyde, n-heptylaldehyde, n-octylaldehyde, 2-ethylhexylaldehyde, n-nonylaldehyde, n-decylaldehyde, benzaldehyde and cinnamaldehyde. Among these compounds, an aliphatic non-branched aldehyde having 2 to 6 carbon atoms is preferred, and n-butyraldehyde is particularly preferred from the viewpoint that a polyvinyl acetal resin having excellent penetration resistance when formed into a laminated glass can be produced more readily. These aldehydes may be used singly, or two or more of them may be used in combination. Furthermore, a polyfunctional aldehyde or an aldehyde having another functional group may also be used in combination in an amount of as small as 20% by mass or less relative to the total mass of all of the aldehydes. In the case where n-butyraldehyde is used in combination with an aldehyde having another functional group, the content of n-butyraldehyde is preferably 50% by mass or more, more preferably 80% by mass or more, still more preferably 95% by mass or more, particularly preferably 99% by mass or more, most preferably 100% by mass.

The viscosity average polymerization degree of the polyvinyl alcohol that serves as a raw material for the polyvinyl acetal resin is preferably 100 or more, more preferably 300 or more, still more preferably 400 or more, particularly preferably 600 or more, extremely preferably 700 or more, most preferably 750 or more. When the viscosity average polymerization degree of the polyvinyl alcohol is equal to or more than the above-mentioned lower limit value, the deformation, disconnection and detachment of the conductive layer during the formation of the conductive layer or the production of a laminated glass can be suppressed more readily and the occurrence of the phenomenon that glasses are misaligned due to heat in the resultant laminated glass can be prevented more readily. The viscosity average polymerization degree of the polyvinyl alcohol is preferably 5000 or less, more preferably 3000 or less, still more preferably 2500 or less, particularly preferably 2300 or less, most preferably 2000 or less. When the viscosity average polymerization degree of the polyvinyl alcohol is equal to or less than the above-mentioned upper limit value, satisfactory film formability can be achieved more readily. The viscosity average polymerization degree of the polyvinyl alcohol can be measured in accordance with, for example, JIS K 6726 "Polyvinyl alcohol Test Method".

In general, the viscosity average polymerization degree of the polyvinyl acetal resin coincides with the viscosity average polymerization degree of the polyvinyl alcohol that is a raw material. Therefore, the above-mentioned preferred viscosity average polymerization degree of the polyvinyl alcohol coincides with the preferred viscosity average polymerization degree of the polyvinyl acetal resin. In the case where the resin layer (1) comprises two or more polyvinyl acetal resins, it is preferred that the viscosity average polymerization degree of at least one of the polyvinyl acetal resins is equal to or more than the above-mentioned lower limit value and equal to or less than the above-mentioned upper limit value.

The acetyl group amount in the polyvinyl acetal resin can be adjusted by appropriately adjusting the degree of saponification of the polyvinyl alcohol or the vinyl alcohol copolymer which is a raw material for the polyvinyl acetal resin. The acetyl group amount has influence on the polarity of the polyvinyl acetal resin in such a manner that the compatibility of the resin layer (1) with a plasticizer and the mechanical strength of the resin layer (1) can vary.

The acetyl group amount in the polyvinyl acetal resin that constitutes the resin layer (1) is preferably 0.1 to 20% by mole, more preferably 0.5 to 12% by mole, still more preferably 0.5 to 8% by mole, per the amount of ethylene units in the polyvinyl acetal main chain. The acetyl group amount can be adjusted to a value falling within the above-mentioned range by adjusting the degree of saponification of the polyvinyl alcohol that is a raw material of the polyvinyl acetal resin. In the case where the resin layer (1) contains a polyvinyl acetal resin having an acetyl group amount falling within the above-mentioned range, the decrease in optical strain or the like can be achieved more readily. In the case where the resin layer (1) contains different two or more polyvinyl acetal resins, it is preferred that the acetyl group amount of at least one of the polyvinyl acetal resins falls within the above-mentioned range.

The acetalization degree of the polyvinyl acetal resin to be used in the resin layer (1) is, for example, preferably 40 to 86% by mole, more preferably 45 to 84% by mole, still more preferably 50 to 82% by mole, particularly preferably 60 to 82% by mole, most preferably 68 to 82% by mole. The acetalization degree of the polyvinyl acetal resin can be adjusted to a value falling within the above-mentioned range by appropriately adjusting the amount of the aldehyde to be used in the acetalization of the polyvinyl alcohol resin. When the acetalization degree falls within the above-mentioned range, the mechanical strength of the laminate of the present invention can become sufficient more readily, and the compatibility between the polyvinyl acetal resin and the plasticizer is less likely to be deteriorated. In the case where the resin layer (1) comprises two or more polyvinyl acetal resins, it is preferred that the acetalization degree of at least one of the polyvinyl acetal resins falls within the above-mentioned range.

The hydroxyl group amount of the polyvinyl acetal resin to be used in the resin layer (1) is preferably 9 to 36% by mole, more preferably 18 to 34% by mole, still more preferably 22 to 34% by mole, particularly preferably 26 to 34% by mole, extremely preferably 26 to 31% by mole, most preferably 26 to 30% by mole, per the amount of ethylene units in the polyvinyl acetal main chain. When the hydroxyl group amount falls within the above-mentioned range, in the case where each of the resin layer (1) and the below-mentioned resin layer (2) is a polyvinyl acetal resin layer, the difference in refractive index between the polyvinyl acetal resin layers is reduced and, as a result, a laminated glass having less optical unevenness can be obtained more readily. Furthermore, the adhesion between the metal foil that constitutes the conductive layer and the polyvinyl acetal resin also becomes excellent. From the viewpoint of improving the sound insulation performance, the hydroxyl group amount of the polyvinyl acetal resin to be used in the present invention is preferably 9 to 29% by mole, more preferably 12 to 26% by mole, still more preferably 15 to 23% by mole, particularly preferably 16 to 20% by mole. The hydroxyl group amount can be adjusted to a value falling within the above-mentioned range by adjusting the amount of the aldehyde to be used in the acetalization of the polyvinyl alcohol resin.

The polyvinyl acetal resin is generally composed of an acetal group unit, a hydroxyl group unit and an acetyl group unit. The amount of each of the units can be determined by, for example, JIS K 6728 "Polyvinyl butyral test method" or a nuclear magnetic resonance method (NMR). In the case where the polyvinyl acetal resin contains a unit other than an acetal group unit, the amount of the remaining acetal group unit can be calculated by determining both of the amount of a hydroxyl group unit and the amount of an acetyl group unit, and then subtracting the amounts of both of these units from the amount of an acetal group unit obtained in the case where a unit other than an acetal group unit is not contained.

The viscosity of a 1/1 (by mass) toluene/ethanol solution containing the polyvinyl acetal resin constituting the resin layer (1) at a concentration of 10% by mass is preferably 200 mPa·s or more, more preferably 240 mPa·s or more, as measured with a Brookfield-type (B-type) viscometer at 20° C., 30 rpm. By using a polyvinyl acetal resin produced using a polyvinyl alcohol having a high viscosity average polymerization degree as a raw material or one of raw materials or by using the polyvinyl acetal resin in combination, it becomes possible to adjust the viscosity of the polyvinyl acetal resin to a value equal to or more than the above-mentioned lower limit value. In the case where the polyvinyl acetal resin constituting the resin layer (1) comprises a mixture of a plurality of resins, it is preferred that the viscosity of the mixture is equal to or more than the above-mentioned lower limit value. When the viscosity of the polyvinyl acetal resin is equal to or more than the above-mentioned lower limit value, the disconnection, detachment, deformation or the like of the conductive layer during the formation of the conductive layer or the production of a laminated glass can be suppressed more readily and the occurrence of the phenomenon that glasses are misaligned due to heat in the resultant laminated glass can be prevented more readily. The upper limit value of the viscosity is generally 1000 mPa·s, preferably 800 mPa·s, more preferably 500 mPa·s, still more preferably 450 mPa·s, particularly preferably 400 mPa·s, from the viewpoint that satisfactory film formability can be achieved more readily.

The number average molecular weight of the polyvinyl acetal resin constituting the resin layer (1) is preferably 53,000 to 100,000, more preferably 54,000 to 80,000, particularly preferably 55,000 to 70,000. By using a polyvinyl acetal resin produced using a polyvinyl alcohol having a high viscosity average polymerization degree as a raw material or one of raw materials or by using the polyvinyl acetal resin in combination, it becomes possible to adjust the number average molecular weight of the polyvinyl acetal resin to a value falling within the above-mentioned range. When the number average molecular weight of the polyvinyl acetal resin falls within the above-mentioned range, desirable film formability and desirable properties (e.g., laminating suitability, creep resistance, breaking strength) can be achieved more readily.

The molecular weight distribution, i.e., the ratio (Mw/Mn) of the weight average molecular weight (Mw) to the number average molecular weight (Mn), of the polyvinyl acetal resin constituting the resin layer (1) is preferably 2.7 or more, more preferably 2.8 or more, particularly preferably 2.9 or more. The molecular weight distribution of the polyvinyl acetal resin can be adjusted to a value equal to or more than the above-mentioned lower limit value by acetarlizing a mixture of polyvinyl alcohols having different viscosity average polymerization degrees or mixing acetalized products of polyvinyl alcohols having different viscosity average polymerization degrees with each other. When the molecular weight distribution of the polyvinyl acetal resin is equal to or more than the above-mentioned lower limit value, both of film formability and desirable properties (e.g., laminating suitability, creep resistance, breaking strength) can be simultaneously achieved more readily. From the viewpoint of easiness of film formation, the upper limit value of the molecular weight distribution is generally 10, preferably 5.

In the case where the resin layer (1) comprises different two or more polyvinyl acetal resins, it is preferred that the number average molecular weight and the molecular weight distribution of at least one of the polyvinyl acetal resins fall within the above-mentioned ranges. Each of the number average molecular weight and the molecular weight distribution can be determined by employing gel permeation chromatography (GPC) using polystyrene having a known molecular weight as a standard.

From the viewpoint of achieving satisfactory film formability more readily, it is preferred that the resin layer (1) contains an uncrosslinked polyvinyl acetal resin. However, the resin layer (1) may also contain a crosslinked polyvinyl acetal resin. The method for crosslinking a polyvinyl acetal is disclosed in, for example, EP 1527107B1 and WO 2004/063231 A1 ("Thermal self-crosslinking of polyvinyl acetal containing carboxyl group"), EP 1606325 A1 ("Polyvinyl acetal crosslinked with polyaldehyde"), and WO 2003/020776 A1 ("Polyvinyl acetal crosslinked with glyoxylic acid"). A method is also effective, in which the conditions for the acetalization reaction are appropriately modified to adjust the amount of formed intermolecular acetal bonds or adjust the degree of blocking of remaining hydroxyl groups.

An example of the ionomer resin to be used in the resin layer (1) is a resin having a constituent unit derived from ethylene and a constituent unit derived from an α,β-unsaturated carboxylic acid, wherein at least a part of the constituent unit derived from an α,β-unsaturated carboxylic acid is neutralized with a metal ion such as a sodium ion. In an ethylene-(α,β-unsaturated carboxylic acid) copolymer that is not neutralized with the metal ion yet, the content of the α,β-unsaturated carboxylic acid-derived constituent unit is preferably 2% by mass or more, more preferably 5% by mass or more, based on the mass of the ethylene-(α,β-unsaturated carboxylic acid) copolymer. The content of the α,β-unsaturated carboxylic acid-derived constituent unit is also preferably 30% by mass or less, more preferably 20% by mass or less. Examples of the α,β-unsaturated carboxylic acid-derived constituent unit in the ionomer resin include constituent units respectively derived from acrylic acid, methacrylic acid, maleic acid, monomethyl maleate, monoethyl maleate and anhydrous maleic acid. Among these constituent units, a constituent unit derived from acrylic acid or methacrylic acid is particularly preferred. From the viewpoint of the easy availability, the ionomer resin is more preferably an ionomer of an ethylene-(acrylic acid) copolymer and an ionomer of an ethylene-(methacrylic acid) copolymer are more preferred, and a zinc ionomer of an ethylene-(acrylic acid) copolymer, a sodium ionomer of an ethylene-(acrylic acid) copolymer, a zinc ionomer of an ethylene-(methacrylic acid) copolymer and a sodium ionomer of an ethylene-(methacrylic acid) copolymer are particularly preferred.

The (meth)acrylate-based resin that can be contained in the resin layer (1) may be a cured product of a curable composition containing a (meth)acrylate compound that can cause a curing reaction through thermal curing or photocuring. An example of the (meth)acrylate compound is a vinyl group-containing oligomer or polymer, such as a urethane-modified (meth)acrylate, an epoxy-modified (meth)acrylate, a polyester (meth)acrylate, a polymer polyol-type (meth)acrylate and a bisphenol-A polyethoxylated (meth)acrylate. These compounds may be used singly, or two or more of them may be used in combination. The term "(meth)acrylate" as used herein is a general name for "acrylate" and "methacrylate".

The curable composition may contain a thermal polymerization initiator. Thermal polymerization initiator is a curing gent capable of generating radical with heat. Examples of the thermal polymerization initiator include: an organic peroxide such as di-t-butyl peroxycarbonate, diisopropyl peroxydicarbonate, di-2-ethylhexyl peroxydicarbonate, t-butyl peroxydineodecanoate, t-butyl peroxypivalate, 3,5,5-trimethylhexanoyl peroxide, lauroyl peroxide, acetyl peroxide, t-butyl peroxy(2-ethylhexanoate), t-butyl peroxyisobutyrate, t-butylperoxy isopropyl carbonate, t-butyl peroxybenzoate, di-t-amyl peroxide and di-t-butyl peroxide; and an azo compound such as 2,2'-azobis(4-methoxy-2,4-dimethylvaleronitrile), 2,2-'azobis(2,4-dimethylvaleronitrile), 2,2'-azobisisobutyronitrile, dimethyl-2,2'-azobisisobutyrate, 2,2'-azobis(2-methylbutyronitrile), 1,1'-azobisisobutyrate and 1,1'-azobis(1-cyclohexanecarbonitrile). These thermal polymerization initiators may be used singly, or two or more of them may be used in combination.

The content of the thermal polymerization initiator is generally 0.01 to 10 parts by mass, preferably 0.03 to 5 parts by mass, relative to 100 parts by mass of the curable composition.

The curable composition may contain a photopolymerization initiator. The photopolymerization initiator is a curing agent capable of generating radical upon the irradiation with light having a specific wavelength. Examples of the polymerization initiator include acetophenone, benzophenone, an α-hydroxyalkylphenone, Michler's Ketone, benzoin, benzyl methyl ketal, benzoylbenzoate, α-acyloxime ester and thioxanthone.

In the case where the photopolymerization initiator is contained, a photopolymerization accelerator may also be contained. The photopolymerization accelerator can reduce the polymerization inhibition by air and can also accelerate the curing rate during curing, and comprises, for example, at least one compound selected from p-dimethylaminobenzoic acid isoamyl ester, p-Dimethylaminobenzoic acid ethyl ester and the like.

The (meth)acrylate-based resin to be used may be in the form of a solution prepared by dissolving or dispersing the (meth)acrylate-based resin in a solvent. Examples of the solvent include an alcohol-type solvent, an ester-type solvent, a ketone-type solvent, a hydrocarbon-type solvent, an ether-type solvent, a chlorine-containing solvent and an amide-type solvent. These solvents may be used singly, or two or more of them may be used in combination. With respect to the (meth)acrylate-based resin, a (meth)acrylate-based resin having a film-like form can be used preferably, and a laminate of the films can also be used.

An example of the silicone-based resin is a silicone rubber such as polyorganosiloxane.

The resin layer (1) may contain a plasticizer. In the case where the resin layer (1) contains a plasticizer, it is preferred to use one or more compounds selected from the compounds included in the following group as the plasticizer.

An ester of a polyvalent aliphatic or aromatic acid. Examples of the ester include a dialkyl adipate (e.g., dihexyl adipate, di-2-ethylbutyl adipate, dioctyl adipate, di-2-ethylhexyl adipate, hexylcylcohexyl adipate, a mixture of heptyl adipate and nonyl adipate, diisononyl adipate, heptyl adipate); an ester of adipic acid and an alcohol including an alicyclic ester alcohol or ether compound (e.g., di(butoxyethyl) adipate, di(butoxyethoxyethyl) adipate); a dialkyl sebacate (e.g., dibutyl sebacate); an ester of sebacic acid and an alcohol including an alicyclic or ether compound; an ester of phthalic acid (e.g., butylbenzyl phthalate, bis-2-butoxyethyl phthalate); and an ester of an alicyclic polycarboxylic acid and an aliphatic alcohol (e.g., 1,2-cyclohexanedicaroboxylic acid diisononyl ester).

An ester or ether of a polyhydric aliphatic or aromatic alcohol or an oligoether glycol having one or more aliphatic or aromatic substituent. An example of the ester or ether is an ester of glycerin, diglycol, triglycol, tetraglycol or the like and a linear or branched aliphatic or alicyclic carboxylic acid. Examples of the ester include diethylene glycol-bis-(2-ethylhexanoate), triethylene glycol-bis-(2-ethylhexanoate), triethylene glycol-bis-(2-ethylbutanoate), tetraethylene glycol-bis-n-heptanoate, triethylene glycol-bis-n-heptanoate, triethylene glycol-bis-hexanoate, tetraethylene glycol dimethyl ether and dipropylene glycol benzoate.

A phosphoric acid ester of an aliphatic or aromatic ester alcohol. Examples of the phosphoric acid ester include tris(2-ethylhexyl) phosphate (TOF), triethyl phosphate, diphenyl-2-ethylhexyl phosphate and tricresyl phosphate.

An ester of citric acid, succinic acid and/or fumaric acid.

In addition, a polyester or oligoester formed from a polyhydric alcohol and a polycarboxylic acid, or a terminal-esterified or etherified product of the polyester or oligoester; a polyester or oligoester formed from a lactone or a hydroxycarboxylic acid, or a terminal-esterified or etherified product of the polyester or oligoester; and others may also be used as the plasticizer.

The content of the plasticizer in the resin layer (1) is preferably less than 50% by mass, more preferably 0 to 40% by mass, still more preferably 0 to 30% by mass, particularly preferably 0 to 20% by mass, extremely preferably 0 to 10% by mass, based on the mass of the resin layer (1). In the case where the resin layer (1) comprises a polyvinyl acetal resin, the content of the plasticizer is less than 20 parts by mass, preferably 0 to 19 parts by mass, more preferably 0 to 15 parts by mass, still more preferably 0 to 10 parts by mass, particularly preferably 0 to 5 parts by mass, relative to 100 parts by mass of the polyvinyl acetal resin. When the content of the plasticizer falls within the above-mentioned range, a laminate having excellent film formability and handling properties can be produced more readily and the disconnection, detachment, deformation or the like of the conductive layer during the formation of the conductive layer or during the production of a laminated glass can be suppressed. As a result, satisfactory heat-generating properties can be achieved more readily. It is also preferred that the resin layer (1) does not contain a plasticizer, from the viewpoint of suppressing the thermal deformation of the resin layer during the formation of a film or during the formation of conductive fine wires and also suppressing the disconnection, detachment, deformation or the like of the conductive layer in association with the aforementioned thermal deformation.

The resin layer (1) may contain an additive such as an ultraviolet ray absorber, an antioxidant agent, an adhesion modifier, a whitening agent or a fluorescent whitening agent, a stabilizing agent, a dye, a processing auxiliary agent, organic or inorganic nanoparticles, calcined silicate, a corrosion inhibitor, a surface activating agent and water. These additives may be used singly, or two or more of them may be used in combination.

In one embodiment, it is preferred that the resin layer (1) contains a corrosion inhibitor in order to suppress the corrosion of the heat-generating conductive layer. The content of the corrosion inhibitor to be contained in the resin layer (1) is preferably 0.005 to 5% by mass based on the mass of the resin layer (1). An example of the corrosion inhibitor is substituted or unsubstituted benzotriazole.

The thickness of the resin layer (1) is selected appropriately depending on whether or not the resin layer (1) is included as a constituent of the below-mentioned heat-generating conductive layer-including film in a laminated glass, in other words, whether the resin layer (1) is to be detached at the interface with the base material film or at the interface with the heat-generating conductive layer. In the case where the resin layer (1) is detached at the interface with the base material film and the resultant product is used in a laminated glass, the thickness of the resin layer (1) is preferably less than 200 µm, more preferably 100 µm or less, still more preferably 50 µm or less. The thickness of the resin layer (1) is also preferably 10 µm or more, more preferably 15 µm or more. When the thickness falls within the above-mentioned range, the resin layer (1) can be produced stably, the thermal shrinkage of the resultant laminate can be prevented effectively, and the disconnection, detachment, deformation or the like of the heat-generating conductive layer can be prevented or suppressed effectively. Particularly the matter that the resin layer (1) is made thin is more preferred in the case where it is intended to heat the surface of a specific glass rapidly, because heat coming from the heat-generating conductive layer can be transferred to the surface of a glass rapidly. In a use method in which the resin layer (1) is left on the base material film, in other words, in the case where the resin layer (1) is detached at the interface between the resin layer (1) and the heat-generating conductive layer upon use, the thickness of the resin layer (1) is preferably less than 50 µm, more preferably 10 µm or less, still more preferably 5 µm or less. The thickness of the resin layer (1) is also preferably 0.1 µm or more, more preferably 1 µm or more. When the thickness falls within the above-mentioned range, the resin layer (1) can be formed on the base material film stably, and the disconnection, detachment, deformation or the like of the heat-generating conductive layer due to thermal shrinkage of the resultant laminate can be prevented or suppressed effectively.

The surface roughness Rz of the resin layer (1) on the heat-generating conductive layer-laminating side thereof is preferably less than 5 µm, more preferably 3 µm or less, still more preferably 2 µm or less, before the lamination of the heat-generating conductive layer. The Rz is also preferably 0.1 µm or more, more preferably 0.5 µm or more. when the surface roughness Rz falls within the above-mentioned range, the detachment of the metal foil from the resin layer (1) during the etching for forming the heat-generating conductive layer can be prevented, the disconnection, detachment, deformation or the like of the resultant heat-generating conductive layer can be prevented or suppressed effectively, and the generation of air bubbles in the interface with the metal foil upon the lamination on the metal foil can be suppressed.

The method for producing the resin layer (1) having a detachable surface is, for example, as follows: the resin, which is optionally blended with a specified amount of a plasticizer and additives as required, is kneaded homogeneously, and then the resultant product is formed into a sheet (layer) by a publicly-known film formation method such as an extrusion method, a calendar method, a press method, a casting method and an inflation method, and the film (layer) is used as the resin layer (1).

Among the publicly-known film formation methods, a method in which the sheet (layer) is produced using an extruder is particularly preferably employed. The resin temperature to be employed in the extrusion is preferably 150 to 250° C., more preferably 170 to 230° C. If the resin temperature is too high, the polyvinyl acetal resin may be decomposed and, as a result, the content of a volatile substance may increase. On the other hand, if the temperature is too low, the content of a volatile substance may also increase. In order to remove the volatile substance effectively, it is preferred to remove the volatile substance through a vent port of the extruder by the reduction of pressure. In the case where the resin layer (1) is produced using an extruder, the resin layer (1) may be melt-extruded onto the metal foil.

<Heat-Generating Conductive Layer>

The laminate of the present invention comprises a heat-generating conductive layer (also simply referred to as a "conductive layer") on a surface of the resin layer (1) which is opposed to the base material film. The heat-generating conductive layer is a current-conducting structure which is provided for generating heat, i.e., a conductive structure for heat generation purpose.

The heat-generating conductive layer is a conductive layer derived from a metal foil, and is preferably produced from a metal foil by employing a photolithographic technique.

From the viewpoint of the easiness of etching and the easy availability of the metal foil, the heat-generating conductive layer is preferably made from copper or silver, more preferably made from copper. Namely, the metal foil is preferably a copper foil or a silver foil, more preferably a copper foil.

Figure 4:
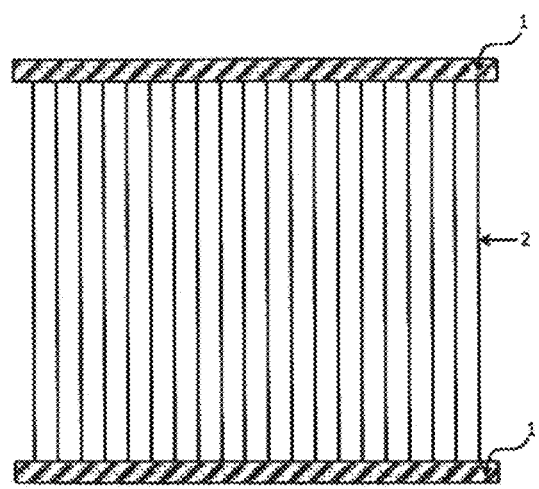
FIG. 4 is a schematic illustration showing one example of the current-conducting structure of the heat-generating conductive layer in the laminate of the present invention.

The heat-generating conductive layer may be composed of a plurality of bus bars, and comprises at least two main bus bars and a plurality of main conductive fine wires connected to the two main bus bars. FIG. 4 is a schematic illustration showing one example of the current-conducting structure of the conductive layer. In FIG. 4, two bus bars 1 are connected to each other through a plurality of straight line-like main conductive fine wires 2. As each of the bus bars 1, a bus bar which is commonly used in the art can be used. Examples of the bus bar include a metal foil tape, a metal foil tape having a conductive adhesive agent attached thereto, and a conductive paste. Alternatively, the bus bar may be formed by leaving a portion of the metal foil as the bus bar simultaneously with the formation of the conductive layer in the present invention. Power feed lines are connected to the bus bars, respectively. An electric current is fed to the conductive layer upon the connection of each of the power feed lines to a power supply.

Each of the main conductive fine wires may be wholly or partly formed in a straight line-like shape (for example, as illustrated in FIG. 4). From the viewpoint that the disconnection, detachment, deformation or the like of the conductive layer is less likely occur, each of the main conductive fine wires is preferably wholly or partly formed in a wavy shape and/or a zig-zag shape, and is particularly preferably wholly formed in a wavy shape and/or a zig-zag shape (for example, as illustrated in FIG. 1). The plurality of main conductive fine wires may have the same shape as each other, or may have different shapes from each other.

The distances between any adjacent two of the main conductive fine wires may be the same as or different from each other and depends on the line widths of the main conductive fine wires. The distance is preferably 5 µm to 5 mm, more preferably 100 µm to 3 mm depending on the line widths of the main conductive fine wires. The matter that the distances fall within this range is advantageous from the viewpoint of visibility, because the haze value of the laminated glass, which relies on the laminate, is decreased. The haze value can be measured by the method mentioned in the section "EXAMPLES". When the distances between any adjacent two of the main conductive fine wires are the same as each other, a shaft of light may be caused by the interference of light, which may become a problem. In contrast, when the distances between any adjacent two of the main conductive fine wires are different from each other, a distribution due to the generation of heat may occur. Therefore, the distances between any adjacent two of the main conductive fine wires are adjusted appropriately depending on the line widths or shapes of the conductive fine wires.

The line width of each of the main conductive fine wires is preferably 1 to 100 µm, more preferably 1 to 30 µm, still more preferably 2 to 15 µm, particularly preferably 3 to 12 µm. When the line width falls within the above-mentioned range, a sufficient heat generation amount can be secured more readily, and a desired level of front visibility can be achieved more readily. The line widths of the plurality of main conductive fine wires may be the same as or different from each other. In each of the main conductive fine wires or the below-mentioned auxiliary conductive fine wire (or wires), the line width may be wholly same, or may be partly different.

The narrowest line width in each of the main conductive fine wires is preferably 20 µm or less, more preferably 15 µm or less, still more preferably 10 µm or less, particularly preferably 5 µm or less. When the narrowest line width falls within the above-mentioned range, the haze value is decreased and the visibility is improved. The narrowest line width in each of the main conductive fine wires is preferably 1 µm or more.

In a preferred aspect, the number of the main conductive fine wires each having a part having a line width of 20 µm or less is preferably 80% or more, more preferably 90% or more, still more preferably 95% or more in the number of all of the main conductive fine wires. When the percentage falls within the above-mentioned range, the haze value is decreased and the visibility is improved. The haze value can be measured by the method mentioned in the section "EXAMPLES", i.e., in accordance with JIS R 3106. Depending on the intended use of a laminated glass, it is desirable that the line width is narrow at a position at which visibility is required, from the viewpoint of achieving front visibility. In general, it is desirable that the line width is 20 µm or less at the center of the glass. It is particularly preferably that each of the main conductive fine wires has a part having a line width of 20 µm or less in a length of 20 cm or more, preferably 50 cm or more. In one embodiment, in each of the main conductive fine wires which has a part having a line width of 20 µm or less, it is also possible that a region close to a bus bar is formed so as to have a line width of more than 20 µm for the purpose of avoiding disconnection and a conspicuous region is formed so as to have a line width of 20 µm or less.

The thickest line width in each of the main conductive fine wires is preferably 50 µm or less, more preferably 30 µm or less, still more preferably 20 µm or less. When the percentage falls within the above-mentioned range, the haze value is decreased and the visibility is improved. In this regard, in the case where it is particularly required to suppress disconnection or to improve heat-generating properties by modifying the shapes or patterns of the main conductive fine wires or the below-mentioned auxiliary conductive fine wire (or wires), the thickest line width of each of the conductive fine wires may be adjusted appropriately as long as visibility or decorative performance cannot be deteriorated. The thickest line width in each of the main conductive fine wires is preferably 5 µm or more.

From the viewpoint of visibility, the conductive layer may have only the main conductive fine wires. However, from the viewpoint of suppressing the disconnection of the current-conducting structure, the conductive layer may also comprise the auxiliary conductive fine wire that connect the main conductive fine wires. In the case where the conductive layer has the auxiliary conductive fine wire (or wires), a plurality of auxiliary conductive fine wires are generally formed. The shape of each of the auxiliary conductive fine wires is preferably, for example, a wholly or partly straight line-like, wavy or zig-zag shape.

In the heat-generating conductive layer, fine wires composed of the main conductive fine wires and the auxiliary conductive fine wires are formed preferably in a grid-like or net-like form, from the viewpoint of achieving front visibility and a desired heat generation amount more readily. The term "grid-like form" includes a mesh-like form within the scope thereof. However, if the haze value is increased and satisfactory visibility cannot be achieved due to the grid width or the mesh form, the mesh-like form may be excluded.

The distances between any adjacent two of the auxiliary conductive fine wires that connect the adjacent main conductive fine wires to each other may be the same as or different from each other, and fall within the range from 3 to 1500 mm. The line width of each of the auxiliary conductive fine wire (or wires) is preferably 1 to 50 µm, more preferably 5 to 20 µm. When the line width falls within the above-mentioned range, a sufficient heat generation amount can be secured more readily and the haze value is decreased, and therefore a desired level of front visibility can be achieved more readily. The line widths of the plurality of auxiliary conductive fine wires may be the same as or different from each other. In each of the auxiliary conductive fine wires, the line width may be wholly same, or may be partly different.

Figure 2:
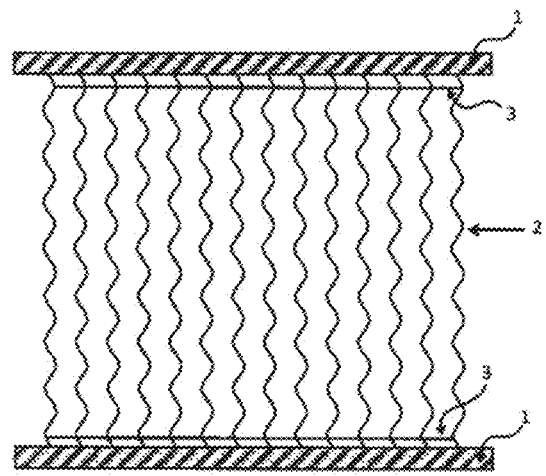
FIG. 2 is a schematic illustration showing one example of the current-conducting structure of the heat-generating conductive layer in the laminate of the present invention.
Figure 3:
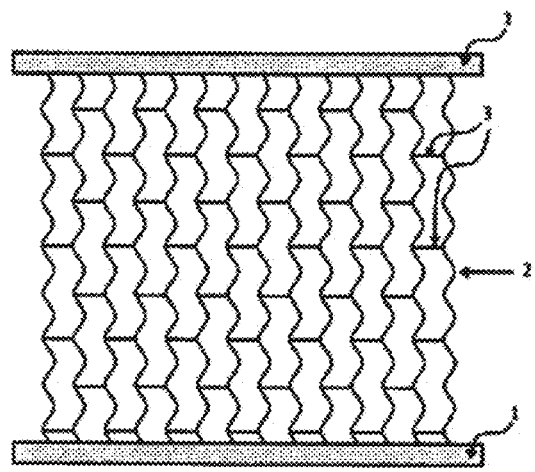
FIG. 3 is a schematic illustration showing one example of the current-conducting structure of the heat-generating conductive layer in the laminate of the present invention.

FIGS. 2 and 3 are schematic illustrations showing examples of the current-conducting structure of the conductive layer. The conductive layer shown in FIG. 2 is provided with two bus bars 1, a plurality of wavy-shape main conductive fine wires 2 that are connected to the bus bars 1, and two straight line-shape auxiliary conductive fine wires 3 that are connected to the plurality of the main conductive fine wires 2, wherein each of the two auxiliary conductive fine wires 3 is arranged at a position close to each of the bus bars 1, preferably a position located 50 µm to 1 mm away from each of the bus bars 1. When the auxiliary conductive fine wires are arranged at positions close to the bus bars, the disconnection that is likely to occur in the vicinity of the bus bars can be suppressed and, even if disconnection occurs at parts of the main conductive fine wires, the energization in the main conductive fine wires can be secured more readily. The conductive layer shown in FIG. 3 is provided with two bus bars 1, a plurality of wavy-shape main conductive fine wires 2 that are connected to the bus bars 1, and a plurality of straight line-shape auxiliary conductive fine wires 3 that connect the plurality of the main conductive fine wires 2 to each other, wherein the auxiliary conductive fine wires 3 are arranged at equal spaces and form a net-like form in conjunction with the main conductive fine wires 2. In the current-conducting structure shown in FIG. 3, the distance between any adjacent two of the main conductive fine wires is preferably 1 to 4 mm, and the distance between adjacent two of the auxiliary conductive fine wires that connect two adjacent main conductive fine wires to each other is 5 to 40 mm. The matter that fine wires composed of the main conductive fine wires 2 and the auxiliary conductive fine wires 3 form a net-like form is advantageous, because disconnection is less likely to occur and a desired heat generation amount can be obtained more readily.

Figure 6:
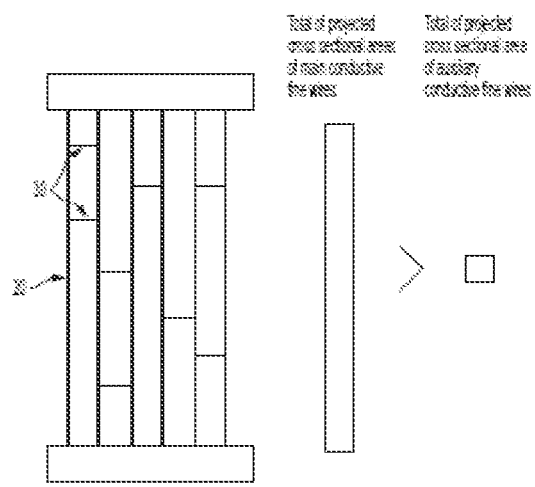
FIG. 6 is an illustration showing one example of the projected cross-sectional area of the heat-generating conductive layer which is projected from the surface of the laminate, and for explaining the relationship between the projected cross-sectional areas of the main conductive fine wires and the projected cross-sectional areas of the auxiliary conductive fine wires.

FIG. 6 shows one example of the projected cross-sectional area of the heat-generating conductive layer in the laminate of the present invention, which is projected from the surface of the laminate. In the projected cross-sectional area of the heat-generating conductive layer shown in FIG. 6 which is projected from the surface of the laminate, the total of the projected cross-sectional areas 30 of the auxiliary conductive fine wires is preferably less than 1-time the total of the projected cross-sectional areas 20 of the main conductive fine wires. This means that the proportion of the projected cross-sectional areas of the auxiliary conductive fine wires is smaller than that of the main conductive fine wires. It is more preferred that the total of the projected cross-sectional areas 30 of the auxiliary conductive fine wires is less than 0.7-time, more preferably less than 0.5-time, the total of the projected cross-sectional areas 20 of the main conductive fine wires. When the total of the projected cross-sectional areas 30 of the auxiliary conductive fine wires is equal to or less than the above-mentioned upper limit value, the haze value is decreased and the visibility can be improved. The total of the projected cross-sectional areas 30 of the auxiliary conductive fine wires is also preferably 0.1-time or more, more preferably 0.3-time or more, the total of the projected cross-sectional areas 20 of the main conductive fine wires. When the total of the projected cross-sectional areas 30 of the auxiliary conductive fine wires is equal to or more than the above-mentioned lower limit value, the disconnection can be suppressed effectively and the heat-generating properties can be improved.

Figure 7:
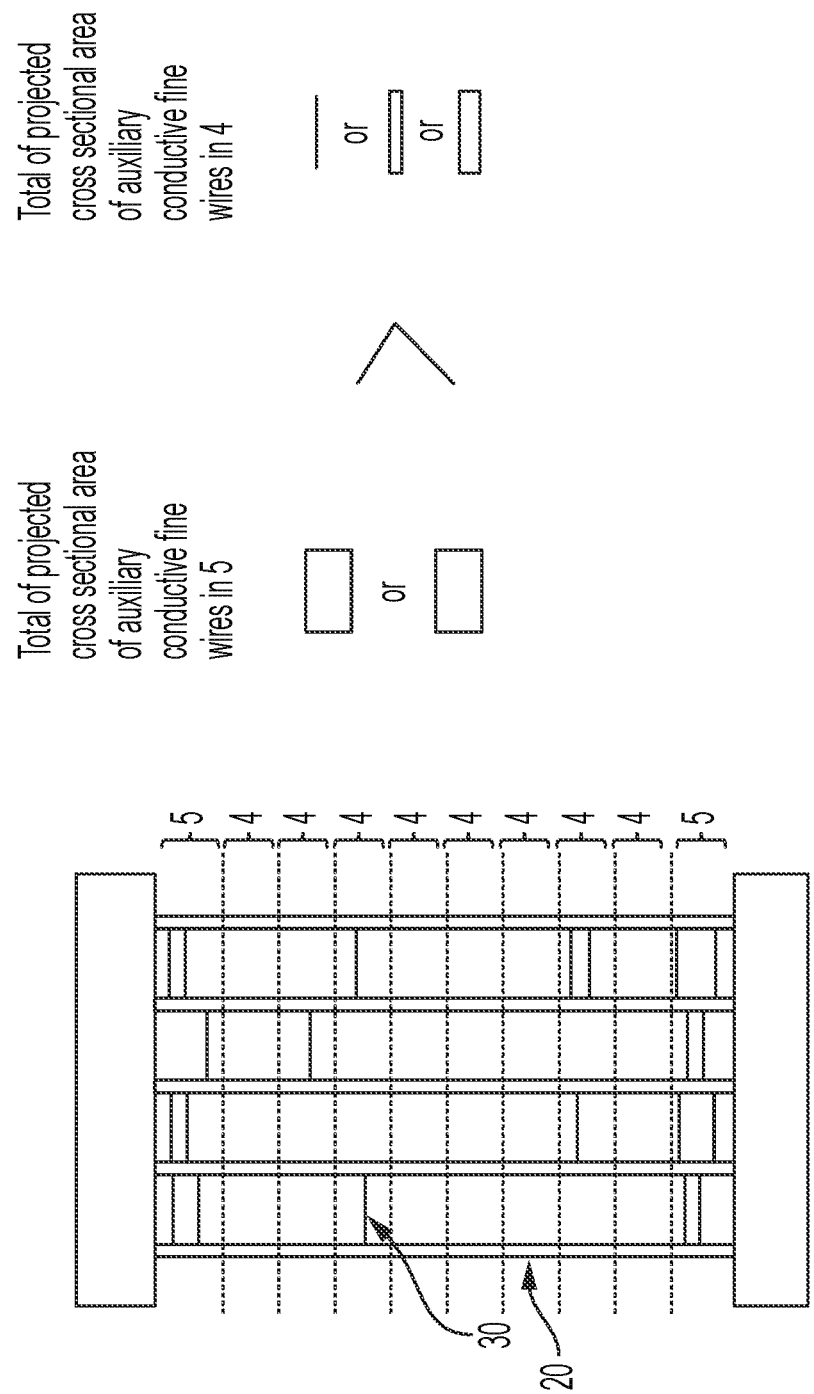
FIG. 7 is an illustration showing one example of the projected cross-sectional area of the heat-generating conductive layer which is projected from the surface of the laminate, and for explaining the relationship between projected cross-sectional areas of the auxiliary conductive fine wires in each of the regions respectively contacting with two main bus bars.

FIG. 7 shows one example of the projected cross-sectional area of the heat-generating conductive layer in the laminate of the present invention, which is projected from the surface of the laminate. In the projected cross-sectional area of the heat-generating conductive layer shown in FIG. 7 which is projected from the surface of the laminate, when an area between the two main bus bars is divided into ten regions at positions at which the length of each of the main conductive fine wires is divided into ten equal parts, it is preferred that the total of the projected cross-sectional areas of the auxiliary conductive fine wires in each of two regions 5 respectively contacting with the main bus bars is larger than that in each of the remaining eight regions 4. This means that the number of the auxiliary conductive fine wires is larger in areas close to the bus bars. Therefore, by arranging the auxiliary conductive fine wires in this manner, the disconnection in areas in the vicinity of the bus bars where the disconnection is likely to occur can be suppressed effectively. It is more preferred that the total of the projected cross-sectional areas of the auxiliary conductive fine wires in each of regions 5 respectively contacting with the two main bus bars is larger by 1.5 times or more, more preferably 2 times or more, still more preferably 3 times or more, than that in each of the remaining eight regions 4. For the purpose of explaining the relationship between the projected cross-sectional areas of the main conductive fine wires and the projected cross-sectional areas of the auxiliary conductive fine wires, examples of the projected cross-sectional area of the heat-generating conductive layer in the laminate of the present invention which is projected from the surface of the laminate are shown in FIGS. 6 and 7.

From the viewpoint of reducing the reflection of light and achieving a desired heat generation amount more readily, the thickness of the heat-generating conductive layer is preferably 1 to 30 µm, more preferably 2 to 20 µm, still more preferably 3 to 15 µm, particularly preferably 3 to 12 µm. The thickness of the heat-generating conductive layer can be measured using a thickness meter, a laser microscope or the like.

One surface or both surfaces and the side surfaces of the heat-generating conductive layer are preferably low-reflectance-treated. The wording "(a surface) is low-reflectance-treated" as used herein refers to the matter that the surface is treated so as to have a visible light reflectance of 30% or less as measured in accordance with JIS R 3106. From the viewpoint of achieving more satisfactory front visibility, it is more preferred that each of the surfaces is treated so as to have a visible light reflectance of 10% or less. When the visible light reflectance is equal to or less than the above-mentioned upper limit value, a desired visible light reflectance can be achieved more readily when the resin layer (1) and the below-mentioned resin layer (2) are laminated on each other to produce a glass for vehicles.

Examples of the low-reflectance treatment include a brackish finish treatment (a darkish finish treatment), a brownish finish treatment, and a plating treatment. From the viewpoint of process passability, the low-reflectance treatment is preferably a blackish finish treatment. Therefore, from the viewpoint of satisfactory front visibility, it is particularly preferred that one surface or both surfaces of the conductive layer is/are blackish-finish-treated so that the visible light reflectance can become 10% or less. More specifically, the blackish finish treatment is carried out using, for example, an alkaline blackish finish solution.

<Resin Layer (2)>

The laminate of the present invention may further comprise a resin layer (2). In this case, it is preferred that the laminate of the present invention comprises the base material film, the resin layer (1) having a detachable surface, the heat-generating conductive layer and the resin layer (2) in this order. The laminate can be produced by, for example, laminating the base material film, the resin layer (1), the metal foil and the base material film in this order, then detaching the base material film positioned on the metal foil side, then forming the heat-generating conductive layer from the metal foil by employing a technique such as photolithography, and then laminating the resin layer (2) on the heat-generating conductive layer.

Examples of the resin constituting the resin layer (2) include a polyvinyl acetal resin, an ionomer resin, an ethylene-(vinyl acetate) copolymer resin, and a polyurethane resin. Among these resins, a polyvinyl acetal resin, an ionomer resin or an ethylene-(vinyl acetate) copolymer resin is preferred from the viewpoint of securing the safety of the laminated glass which relies on the stable adhesiveness to the glass. These resins may be used singly, or two or more of them may be used in combination.

As the polyvinyl acetal resin constituting the resin layer (2), the same polyvinyl alcohol resin as mentioned in the section "Resin layer (1) having detachable surface" can be used. The ranges of the acetalization degree, the acetyl group amount and the hydroxyl group amount are also the same as those mentioned in that section. When the acetalization degree of the polyvinyl acetal resin constituting the resin layer (2) falls within a specified range, a resin layer having excellent penetration resistance or adhesiveness to a glass can be produced more readily when formed into a laminated glass. When the acetyl group amount falls within a specified range, a resin layer (2) having excellent compatibility with a plasticizer can be produced more readily. Furthermore, when the hydroxyl group amount falls within a specified range, a laminated glass having excellent penetration resistance, adhesiveness or sound insulation properties can be produced more readily.

From the viewpoint that satisfactory film formability and laminating suitability can be achieved more readily and the from the viewpoint of reducing the shock against a head part upon crush in a glass for vehicles which contains the resin layer (2), it is preferred that the resin layer (2) contains an uncrosslinked polyvinyl acetal resin. However, the resin layer (2) may also contain a crosslinked polyvinyl acetal resin. The method for crosslinking the polyvinyl acetal resin is the same as that mentioned in the section "Resin layer (1) having detachable surface".

As the ionomer resin constituting the resin layer (2), the same ionomer resin as mentioned in the section "Resin layer (1) having detachable surface" can be used.

In the ethylene-(vinyl acetate) copolymer resin constituting the resin layer (2), the ratio of the amount of a vinyl acetate unit to the total amount of an ethylene unit and the vinyl acetate unit is preferably less than 50% by mole, more preferably less than 30% by mole, still more preferably less than 20% by mole, particularly preferably less than 15% by mole. When the ratio of the amount of the vinyl acetate unit to the total amount of the ethylene unit and the vinyl acetate unit is less than 50% by mole, mechanical strength and flexibility required for the resin layer (2) when used as an intermediate film for the laminated glass tend to be exerted satisfactorily.

The resin layer (2) may contain a plasticizer. As the plasticizer, the same plasticizer as that mentioned in the section "Resin layer (1) having detachable surface" can be used. The resin layer (2) may contain an additive as mentioned in the section "Resin layer (1) having detachable surface", if necessary.

In one embodiment, the content of the plasticizer in the resin layer (2) is 15% by mass or more, preferably 16 to 36% by mass, more preferably 22 to 32% by mass, still more preferably 26 to 30% by mass, based on the mass of the resin layer (2). In the case where the resin layer (2) contains the polyvinyl acetal resin, the content of the plasticizer is preferably 20 parts by mass or more, more preferably 20 to 50 parts by mass, still more preferably 25 to 45 parts by mass, particularly preferably 30 to 40 parts by mass, relative to 100 parts by mass of the polyvinyl acetal resin. When the content of the plasticizer falls within the above-mentioned range, a laminate having excellent impact resistance can be produced more readily, and the disconnection, detachment, deformation or the like is not easy to occur even when a mechanical action occurs. Furthermore, a laminated glass having excellent impact resistance can also be produced more readily. Furthermore, from the viewpoint of imparting a sound insulating function to the resin layer (2), the content of the plasticizer relative to the amount of the polyvinyl acetal resin is preferably 30% by mass or more, more preferably 30 to 50% by mass, still more preferably 31 to 40% by mass, particularly preferably 32 to 35% by mass, based on the mass of the resin layer (2) in the initial stage of the resin layer (2), i.e., before the lamination of the resin layer (2).

In this embodiment, the thickness of the resin layer (2) is preferably 200 µm or more, more preferably 500 µm or more, still more preferably 700 µm or more. The thickness of the resin layer (2) is also preferably 1 mm or less. When the thickness of the resin layer (2) falls within the above-mentioned range, both of penetration resistance and high heat-generating properties can be achieved more readily in the laminated glass.

In one embodiment, the content of the plasticizer in the resin layer (2) is preferably less than 50% by mass, more preferably 0 to 40% by mass, still more preferably 0 to 30% by mass, particularly preferably 0 to 20% by mass, most preferably 0 to 10% by mass, based on the mass of the resin layer (2). In the case where the resin layer (2) contains the polyvinyl acetal resin, the content of the plasticizer is preferably less than 20 parts by mass, more preferably 0 to 19 parts by mass, still more preferably 0 to 15 parts by mass, particularly preferably 0 to 10 parts by mass, most preferably 0 to 5 parts by mass, relative to 100 parts by mass of the polyvinyl acetal resin. When the content of the plasticizer falls within the above-mentioned range, a laminate having excellent film formability and handling properties can be produced more readily and the disconnection, detachment, deformation or the like of the conductive layer during the formation of the conductive layer or during the production the laminated glass can be suppressed more readily. As a result, satisfactory heat-generating properties can be achieved more readily. It is also preferred that the resin layer (2) contains no plasticizer, from the viewpoint of suppressing the thermal deformation of the resin layer during the formation of the film or during the formation of conductive fine wires and also suppressing the disconnection, detachment, deformation or the like of the conductive layer in association with the aforementioned thermal deformation.

In this embodiment, the thickness of the resin layer (2) is preferably less than 200 µm, more preferably 100 µm or less, still more preferably 80 µm or less. The thickness of the resin layer (2) is also preferably 10 µm or more. When the thickness of the resin layer (2) falls within the above-mentioned range, heating efficiency can be improved and the heat-generating properties of the laminated glass can also be improved.

The resin layer (2) can be produced by the same method as the method for producing the resin layer (1) as mentioned in the section "Resin layer (1) having detachable surface".

In the laminate of the present invention, in the case where each of the resin layer (1) and the resin layer (2) contains a polyvinyl acetal resin, the difference between the hydroxyl group amount of a polyvinyl acetal resin constituting the resin layer (1) and of a polyvinyl acetal resin constituting the resin layer (2) is preferably 4% by mass or less, more preferably 3% by mass or less, particularly preferably 2% by mass or less. In the case where the polyvinyl acetal resin constituting the resin layer (1) and/or the polyvinyl acetal resin constituting the resin layer (2) comprises a mixture of a plurality of resins, it is preferred that the difference between the hydroxyl group amount of at least one of the polyvinyl acetal resins constituting the resin layer (1) and that of at least one of the polyvinyl acetal resins constituting the resin layer (2) is equal to or less than the above-mentioned upper limit value. The matter that the difference is equal to or less than the above-mentioned upper limit value is preferred, because the difference in refractive index between the resin layer (1) and the resin layer (2) becomes small in an equilibrium state that is achieved after the migration of the plasticizer in the laminate of the present invention and, as a result, the boundary between the resin layer (1) and the resin layer (2) having different areas from each other cannot be visibly confirmed easily when the resin layer (1) and the resin layer (2) are laminated on each other.

On the other hand, it is also one of preferred aspects that the hydroxyl group amount of the polyvinyl acetal resin constituting the resin layer (1) is reduced compared with the hydroxyl group amount of the polyvinyl acetal resin constituting the resin layer (2) so as to adjust the average plasticizer amount in the resin layer (1) in an equilibrium state achieved after the migration of the plasticizer in the laminate to 30% by mass or more. In this case, the hydroxyl group amount of the polyvinyl acetal resin constituting the resin layer (1) is preferably smaller by 5% by mass or more, more preferably 8% by mass or more, than that of the polyvinyl acetal resin constituting the resin layer (2). When the difference between the above-mentioned hydroxyl group amounts is equal to or more than the above-mentioned lower limit value, the amount of the plasticizer in the resin layer (1) in the equilibrium state can be increased satisfactorily and a laminated glass imparted with a sound insulating function can be produced more readily.

In the case where each of the resin layer (1) and the resin layer (2) contains a plasticizer, from the viewpoint of eliminating the problem associated with the migration of the plasticizers between these resin layers (e.g., the problem of the change in properties over time), it is preferred to use the same plasticizer as that contained in the resin layer (2) or a plasticizer that cannot deteriorate a property (e.g., heat resistance, light resistance, transparency, plasticization efficiency) of the resin layer (2). From these viewpoints, it is preferred to contain triethylene glycol-bis-(2-ethylhexanoate) (3G0 or 3G8), triethylene glycol-bis(2-ethylbutanoate), tetraethylene glycol-bis-(2-ethylhexanoate) or tetraethylene glycol-bisheptanoate, and it is particularly preferred to contain triethylene glycol-bis-(2-ethylhexanoate) (3G0 or 3G8), as the plasticizer.

In the present invention, a laminate comprising the base material film, the resin forming the resin layer (1) and the metal foil in this order is subjected to a technique such as photolithographic to form the conductive layer. Namely, due to the presence of the base material film, the disconnection, detachment, deformation or the like of the current-conducting structure in the conductive layer, which may be caused as the result of the thermal shrinkage of the resin layer (1) or the warpage, deformation or the like of the resin layer (1) caused by an etching treatment, can be suppressed. Therefore, even if a mechanical action occurs particularly during the transportation of the laminate or the like, the disconnection, detachment, deformation or the like of the conductive layer is not easy to occur and excellent heat-generating properties can be achieved. Furthermore, because the haze value is small after being formed into a laminated glass, the laminated glass can have excellent visibility.

The laminate of the present invention can also comprise another layer that is different from the base material film, the resin layer (1), the heat-generating conductive layer or the resin layer (2), as long as the effects of the present invention cannot be interfered.

An example of the another layer is a functional layer. Examples of the functional layer include an infrared ray reflecting layer, an ultraviolet ray reflecting layer, a color correcting layer, an infrared ray absorbing layer, an ultraviolet ray absorbing layer, a fluorescence or light emitting layer, a sound insulating layer, an electrochromic layer, a thermochromic layer, a photochromic layer, a decorative layer, and a high-elastic-modulus layer. Examples of the layer configuration of the laminate of the present invention are as follows. The position of the functional layer may be any one of positions <2> to <4> and <6> to <9>, or the functional layers may be located at two or more positions among the above-mentioned positions.

<1> A (base material film)/(resin layer (1))/(heat-generating conductive layer) three-layer configuration.

<2> A (base material film)/(functional layer)/(resin layer (1))/(heat-generating conductive layer) four-layer configuration.

<3> A (base material film)/(resin layer (1))/(functional layer)/(heat-generating conductive layer) four-layer configuration.

<4> A (base material film)/(resin layer (1))/(heat-generating conductive layer)/(functional layer) four-layer configuration.

<5> A (base material film)/(resin layer (1))/(heat-generating conductive layer)/(resin layer (2)) four-layer configuration.

<6> A (base material film)/(functional layer)/(resin layer (1))/(heat-generating conductive layer)/(resin layer (2)) five-layer configuration.

<7> A (base material film)/(resin layer (1))/(functional layer)/(heat-generating conductive layer)/(resin layer (2)) five-layer configuration.

<8> A (base material film)/(resin layer (1))/(heat-generating conductive layer)/(functional layer)/(resin layer (2)) five-layer configuration.

<9> A (base material film)/(resin layer (1))/(heat-generating conductive layer)/(resin layer (2))/(functional layer) five-layer configuration.

<Method for Producing Laminate>

The laminate of the present invention can be produced by a method comprising the steps of laminating the base material film, the resin layer (1) and the metal foil in this order; and forming the heat-generating conductive layer from the metal foil. Alternatively, the laminate of the present invention can also be produced by a method comprising the steps of laminating the base material film, the resin layer (1), the metal foil and the base material film in this order; detaching the base material film located on the metal foil side; and forming the heat-generating conductive layer from the metal foil. In the case where the laminate of the present invention has the resin layer (2), the laminate of the present invention can be produced by a method as mentioned above, which further comprises the step of laminating the heat-generating conductive layer and the resin layer (2) on each other.

For the step of laminating the base material film, the resin layer (1) and the metal foil in this order, a method in which the base material film, the resin layer (1) and the metal foil are overlaid in this order and the resultant product is thermally press bonded together, a method in which the resin layer is formed on the base material film through a process comprising applying the resin layer onto the base material film and then drying a solvent in the resin layer, then overlaying the metal foil on the resin layer, and then thermally press bonding the resultant product, or the like can be employed. For the step of laminating the base material film, the resin layer (1), the metal foil and the base material film in this order, a method in which the base material film, the resin layer (1), the metal foil and the base material film are overlaid in this order and the resultant product is thermally press bonded together, a method in which the resin layer is formed on the base material film through a process comprising applying the resin layer onto the base material film and then drying a solvent in the resin layer, then overlaying the metal foil and the base material film on the resultant product, and then thermally press bonding the resultant product, or the like can be employed.

The thermal press bonding temperature may be determined depending on the type of the resin constituting the resin layer (1), and is generally 70 to 170° C., preferably 90 to 160° C., more preferably 100 to 155° C., still more preferably 110 to 150° C. When the thermal press bonding temperature falls within the above-mentioned range, satisfactory strength can be achieved more readily.

The step of forming the heat-generating conductive layer from the resultant metal foil can be carried out by employing a publicly-known photolithographic technique. The step is carried out by, for example, laminating a dry film resist onto the metal foil in a laminate having a PET film, the resin layer (1) and the metal foil in this order, then forming an etching-resistant pattern by employing a photolithographic technique, then immersing the resin layer (1) having the etching-resistant pattern formed thereon in a metal etching solution to form the conductive layer, and then removing the remaining photoresist layer by a publicly-known method, as mentioned below in the section "EXAMPLES".

For the step of laminating the heat-generating conductive layer and the resin layer (2) on each other, the same method as the method comprising overlaying the base material film, the resin layer (1) and the metal foil in this order and then thermal press bonding the resultant product can be employed, for example.

According to this production method, a conductive layer having a desired shape can be formed in a simple and easy manner and, therefore, the production efficiency of the laminate of the present invention can be improved.

The laminate of the present invention is preferably a laminate of a heat generation use, more preferably a film for laminated glass heating use.

[Heat-Generating Conductive Layer-Including Film]

The heat-generating conductive layer-including film (i.e., film including a heat-generating conductive layer) of the present invention can be produced by detaching the base material film from the laminate of the present invention, or by detaching the base material film and the resin layer (1) from the laminate of the present invention. The heat-generating conductive layer-including film produced by detaching the base material film preferably has the resin layer (1) and the heat-generating conductive layer in this order, more preferably has the resin layer (1), the heat-generating conductive layer and the resin layer (2) in this order. The heat-generating conductive layer-including film produced by detaching the base material film and the resin layer (1) preferably has the heat-generating conductive layer, and more preferably has the heat-generating conductive layer and the resin layer (2) in this order. The heat-generating conductive layer-including film of the present invention does not undergo the disconnection, detachment, deformation or the like of the conductive layer, and a laminated glass comprising the heat-generating conductive layer-including film can have excellent heat-generating properties and visibility.

[Laminated Glass]

The laminated glass of the present invention comprises:
at least two glasses; and
a heat-generating conductive layer-including film having the resin layer (1) and the heat-generating conductive layer in this order, preferably a heat-generating conductive layer-including film having the resin layer (1), the heat-generating conductive layer and the resin layer (2) in this order, which is intercalated between at least two glasses. In another aspect, the laminated glass of the present invention comprises:
at least two glasses, and
a heat-generating conductive layer-including film having the heat-generating conductive layer, preferably a heat-generating conductive layer-including film having the heat-generating conductive layer and the resin layer (2) in this order, and a resin layer (4) comprising at least one resin selected from the group consisting of a polyvinyl acetal resin, an ionomer resin and an ethylene-(vinyl acetate) copolymer resin, both of which are intercalated between the at least two glasses,
wherein the resin layer (4) is arranged on a surface contacting with the heat-generating conductive layer.

The glass is preferably an inorganic glass or an organic glass such as a methacrylate resin sheet, a polycarbonate resin sheet, a polystyrene resin-based resin sheet, a polyester-based resin sheet and a polycycloolefin-based resin sheet, more preferably an inorganic glass, a methacrylate resin sheet or a polycarbonate resin sheet, particularly preferably an inorganic glass, from the viewpoint of transparency, weather resistance and mechanical strength. Examples of the inorganic glass include a float glass, a strengthened glass, a semi-strengthened glass, a chemically strengthened glass, a green glass and a silica glass.

In the laminated glass of the present invention, the conductive layer may be in contact with the glass, the resin layer (1), the resin layer (2) or another layer. In the case where the conductive layer is in contact with the glass directly, the sealing of the conductive layer may be insufficient and, therefore, water may invade to cause the corrosion of the conductive layer, or air may remain during the production of the laminated glass to cause air bubbles to remain or to cause detachment. Therefore, it is preferred that the conductive layer is not in contact with the glass in the laminated glass.

Particularly in the case where the laminated glass of the present invention is to be used in a glass for vehicles, particularly a front glass for vehicles, it is preferred to arrange the laminated glass in such a manner that a low-reflectance-treated surface of the conductive layer faces the occupant side, from the viewpoint of front visibility.

Furthermore, from the viewpoint of avoiding the invasion of water from an edge of the laminated glass to cause the corrosion of the conductive layer, it is preferred that the conductive layer is arranged inside by 1 cm or more of an edge of the laminated glass.

In the laminated glass of the present invention, the distance between the conductive layer and an inside surface of at least one of the glasses is preferably less than 200 μm, more preferably 100 μm or less, still more preferably 50 μm or less. The distance between the conductive layer and an inside surface of at least one of the glasses is also preferably 10 μm or more, more preferably 15 μm or more. When the distance between the conductive layer and an inside surface of at least one of the glasses falls within the above-mentioned range, the efficiency of the heating of a glass surface can be improved and therefore high heat-generating properties can be achieved.

The polyvinyl acetal resin, the ionomer resin and the ethylene-(vinyl acetate) copolymer resin to be contained in the resin layer (4) are the same as those mentioned in the section "Resin layer (1) having detachable surface".

The thickness of the resin layer (4) is preferably 200 to 1000 μm, more preferably 500 to 1000 μm, still more preferably 700 to 1000 μm. When the thickness of the resin layer (4) falls within the above-mentioned range, both of penetration resistance and high heat-generating properties can be achieved simultaneously more readily in the laminated glass.

In the laminated glass of the present invention, the total thickness of a layer (or layers) containing the polyvinyl acetal resin is preferably less than 1 mm, more preferably 900 μm or less, still more preferably 850 μm or less. The total thickness of the layer (or layers) containing the polyvinyl acetal resin is also preferably 110 μm or more, more preferably 300 μm or more, still more preferably 500 μm or more. When the thickness of the layer (or layers) containing the polyvinyl acetal resin falls within the above-mentioned range, high heat-generating properties and penetration resistance can be achieved in the laminated glass.

Examples of the layer configuration in the laminated glass of the present invention are as follows. The position of the functional layer may be any one of positions <1>, <2> and <5> to <16>, or the functional layers may be located at two or more positions among the above-mentioned positions.

<1> A (glass A)/(resin layer (1))/(conductive layer)/(functional layer)/(glass B) five-layer configuration;

<2> a (glass A)/(resin layer (4))/(conductive layer)/(functional layer)/(glass B) five-layer configuration;

<3> a (glass A)/(resin layer (1))/(conductive layer)/(resin layer (2))/(glass B) five-layer configuration;

<4> a (glass A)/(resin layer (4))/(conductive layer)/(resin layer (2))/(glass B) five-layer configuration;

<5> a (glass A)/(functional layer)/(resin layer (1))/(conductive layer)/(functional layer)/(glass B) six-layer configuration;

<6> a (glass A)/(functional layer)/(resin layer (4))/(conductive layer)/(functional layer)/(glass B) six-layer configuration;

<7> a (glass A)/(resin layer (1))/(functional layer)/(conductive layer)/(functional layer)/(glass B) six-layer configuration;

<8> a (glass A)(resin layer (4))/(functional layer)/(conductive layer)/(functional layer)/(glass B) six-layer configuration;

<9> a (glass A)/(functional layer)/(resin layer (1))/(conductive layer)/(resin layer (2))/(glass B) six-layer configuration;

<10> a (glass A)/(functional layer)/(resin layer (4))/(conductive layer)/(resin layer (2))/(glass B) six-layer configuration;

<11> a (glass A)/(resin layer (1))/(functional layer)/(conductive layer)/(resin layer (2))/(glass B) six-layer configuration;

<12> a (glass A)/(resin layer (4))/(functional layer)/(conductive layer)/(resin layer (2))/(glass B) six-layer configuration;

<13> a (glass A)/(resin layer (1))/(conductive layer)/(functional layer)/(resin layer (2))/(glass B) six-layer configuration;

<14> a (glass A)/(resin layer (4))/(conductive layer)/(functional layer)/(resin layer (2))/(glass B) six-layer configuration;

<15> a (glass A)/(resin layer (1))/(conductive layer)/(resin layer (2))/(functional layer)/(glass B) six-layer configuration; and <16> a (glass A)/(resin layer (4))/(conductive layer)/(resin layer (2))/(functional layer)/(glass B) six-layer configuration.

The laminated glass of the present invention is formed from the laminate, and therefore does not undergo the disconnection, detachment or the like of the conductive layer, preferably the disconnection, detachment and deformation of the conductive layer, and has excellent heat-generating properties. Furthermore, the laminated glass also has a small haze value and therefore has excellent front visibility.

When the laminated glass of the present invention is irradiated with light from the side of a low-reflectance-treated surface (e.g., a blackish-finish-treated surface) thereof, the haze value is generally 2.0 or less, preferably 1.8 or less, more preferably 1.5 or less. When the laminated glass of the present invention is irradiated with light from the side of a metallic glossy surface thereof, the haze value is generally 3.0 or less, preferably 2.8 or less, more preferably 2.5 or less. The haze value can be adjusted to a value equal to or less than the upper limit value by appropriately adjusting the line width or shape of the conductive layer in the manner mentioned in the section "Heat-generating conductive layer".

The laminated glass of the present invention can be used as a laminated glass in a building or a vehicle. The term "glass for vehicles" as used herein refers to a front glass, a rear glass, a roof glass, a side glass or the like for a vehicle such as a locomotive, an electric train, a motor car, a ship and an airplane.

It is preferred that fine wires of the current-conducting structure are not confirmed visually from the position of an occupant or an observer from the side of a low-reflectance-treated surface (e.g., a blackish-finish-treated surface) of the laminated glass of the present invention. Because the wires are not observed visually, the laminated glass of the present invention can be used suitably particularly in a use application for which satisfactory front visibility is required, such as a front glass for vehicles. The visibility of the conductive layer can be evaluated sensorily.

In the laminated glass of the present invention, the plasticizer contained in the resin layer (1) and/or the resin layer (2) generally migrates to the other resin layer which does not contain the plasticizer or the other resin layer which contains the plasticizer in a relatively smaller amount with the elapse of time, so that the amount of the plasticizer contained in the resin layer (1) and that in the resin layer (2) are almost the same as each other. In the present invention, this average plasticizer amount is preferably 18 to 35% by mass, more preferably 20 to 30% by mass, particularly preferably 25 to 29% by mass. When the average plasticizer amount falls within the above-mentioned range, desired properties of the laminated glass, such as a property that shock against the head part of an occupant upon crash can be reduced, can be achieved more readily. The average amount of the plasticizer can be calculated after the migration of the plasticizer in accordance with the following formula.

$$\text{Average amount of plasticizer (\% by mass)} = (A \times a + B \times b)/(a+b) \quad \text{[Mathematical formula 1]}$$

A (% by mass): amount of plasticizer in resin layer (1)
a (mm): thickness of resin layer (1)
B (% by mass): amount of plasticizer in resin layer (2)
b (mm): thickness of resin layer (2)

The average plasticizer amount can be adjusted to a value falling within the above-mentioned range by adjusting the amount of the plasticizer to be contained in the resin layer (1), the thick of the resin layer (1), the amount of the plasticizer to be contained in the resin layer (2) and the thickness of the resin layer (2).

It is preferred that the difference between the visible light reflectance of the laminated glass of the present invention and the visible light reflectance of a laminated glass that is the same as the laminated glass of the present invention except that no conductive layer is included is small. When the difference is small, the laminated glass of the present invention can have excellent front visibility. Particularly, the laminated glass of the present invention can be used suitably in use applications for which satisfactory front visibility is required, such as a front glass for vehicles. The visible light reflectance of the laminated glass can be measured in accordance with JIS R 3106. The aforementioned difference can be reduced by, for example, configuring the laminated glass in such a manner that a low-reflectance treated surface of the conductive layer is arranged on the occupant side or the observer side of the laminated glass, or by decreasing the line widths in the conductive layer.

The laminated glass of the present invention can be produced by a method publicly-known by a person skilled in the art. For example, the laminated glass can be produced by placing the heat-generating conductive layer-including film on a glass, then overlaying another glass on the heat-generating conductive layer-including film, then carrying out a preliminary press bonding step by wholly or partly fusing the heat-generating conductive layer-including film to the glasses while rising the temperature, and then treating the resultant product with an autoclave.

Examples of the method for achieving the preliminary press bonding step include: a method in which deaeration is carried out under reduced pressure with a vacuum bag, a vacuum ring or a vacuum laminator; a method in which deaeration is carried out with a nip roll; and a method in which compression molding is carried out under a high temperature, from the viewpoint of removing excessive air or performing temporary bonding of adjacent layers to each other.

For example, the vacuum bag method or the vacuum ring method described in EP 1235683 B1 can be carried out, for example, at about $2 \times 10^4$ Pa and at 130 to 145° C.

A vacuum laminator is composed of a chamber that can be heated and can be vacuated, and the laminated glass can be produced in the chamber within a period of time of about 20 to about 60 minutes. In general, it is effective to employ a reduced pressure of 1 to $3 \times 10^4$ Pa and a temperature of 100 to 200° C., particularly 130 to 160° C. In the case where a vacuum laminator is used, the treatment with an autoclave may not be carried out depending on the temperature or pressure to be employed.

The treatment with an autoclave can be carried out, for example, at a pressure of about $1 \times 10^6$ to about $1.5 \times 10^6$ Pa and a temperature of about 100° C. to about 145° C. for about 20 minutes to about 2 hours.

EXAMPLES

Hereinbelow, the present invention will be described with reference to examples and comparative examples. However, the present invention is not intended to be limited by the following examples. The measurement methods for various evaluations are as follows.

<Measurement of Haze Value>

In each of Examples and Comparative Examples, the haze value in a region in the vicinity of the center of a square in the conductive layer in a laminated glass that had been treated with an autoclave was measured by using a haze meter in accordance with JIS R3106. The results are shown in Tables 3 and 4. The haze value was a haze value measured when light was emitted from a blackish finish treated surface side.

<Evaluation of Appearance of Conductive Layer>

In each of Examples and Comparative Examples, each of the state of a conductive layer after etching and the state of a conductive layer after the treatment with an autoclave was observed with naked eyes using a loupe, and the presence or absence of deformation, disconnection or detachment of the wires was evaluated in accordance with the following criteria. The results are shown in Tables 3 and 4.

A: Deformation, disconnection or detachment was not observed.

B: Partial deformation was observed, but disconnection or detachment was not observed.

C: A slight level of disconnection or detachment was observed.

D: Disconnection or detachment (line missing) was observed significantly.

<Evaluation of Heat-Generating Properties of Laminated Glass>

In each of Examples and Comparative Examples, a voltage of 12V was applied between two electrodes respectively attached to bus bars at room temperature using a laminated glass that had been treated with an autoclave to perform energization, and the time of period required until the temperature of a thermo-couple installed at a position in the vicinity of the center of a glass surface that was closer to a current-conducting structure than the other reached 70° C. was measured. The time of period was evaluated in accordance with the following criteria. The results are shown in Tables 3 and 4.

A: shorter than 2 minutes

B: 2 minutes or longer and shorter than 4 minutes

C: 4 minutes or longer

<Surface Roughness Rz>

A Rz value was measured using a surface roughness tester in accordance with JIS B0601-1994.

Production Example 1

A polyvinyl butyral resin 1 (also referred to as a "resin 1", hereinafter) and a polyvinyl butyral resin 2 (also referred to as a "resin 2", hereinafter) were melt-kneaded with each other at a mass ratio shown in Table 2, or a polyvinyl butyral resin 3 (also referred to as a "resin 3", hereinafter) or a polyvinyl butyral resin 4 (also referred to as a "resin 4", hereinafter) was melt-kneaded. In the case where a polyvinyl acetal resin layer contained a plasticizer (a polyvinyl acetal resin layer PVB-I), a specific amount of triethylene glycol-bis-(2-ethylhexanoate) (abbreviated as "3GO", hereinafter) was also melt-kneaded as a plasticizer together with the resin 4. Subsequently, a melt-kneaded product thus produced was extruded in a strand-like shape and was then pelletized into pellets. The pellets thus produced were melt-extruded with a single-screw extruder and a T-die, and then the resultant product was processed with a metallic elastic roll to produce a polyvinyl acetal resin layer having a smooth surface. The thicknesses and the surface roughness Rz values (measured with a surface roughness tester) of the polyvinyl acetal resin layers PVB-a to PVB-I thus produced are shown in Table 2. The physical properties of the resins 1 to 4 used in the production of the polyvinyl acetal resin layers PVB-a to PVB-I are shown in Table 1.

TABLE 1

| Polyvinyl acetal resin | Hydroxyl group amount (% by mole) | Acetalization degree (% by mole) | Acetyl group amount (% by mole) |
|---|---|---|---|
| 1 | 28.5 | 70.8 | 0.7 |
| 2 | 28.9 | 70.4 | 0.7 |
| 3 | 26.5 | 72.6 | 0.9 |
| 4 | 28.8 | 70.5 | 0.7 |

TABLE 2

| | Hydroxyl group amount in resin (% by mole) | | | | | Resin 1: resin 2 (by mass) | Viscosity of 1/1 toluene/ethanol solution containing resin at concentration of 10% by mass (mPa · s) | | | | Thickness of layer(s) indicated in left column (μm) | Plasticizer (part by weight) | Surface roughness Rz (μm) |
|---|---|---|---|---|---|---|---|---|---|---|---|---|---|
| Resin layer | Resin 1 | Resin 2 | Resin 1 + Resin 2 | Resin 3 | Resin 4 | | Resin 1 | Resin 2 | Resin 1 + Resin 2 | Resin 3 | | | |
| PVB-a | 28.5 | 28.9 | 28.6 | — | — | 75:25 | 152 | 1410 | 245 | — | 50 | 0 | 1.3 |
| PVB-b | 28.5 | 28.9 | 28.6 | — | — | 75:25 | 152 | 1410 | 245 | — | 25 | 0 | 1.2 |
| PVB-c | 28.5 | 28.9 | 28.6 | — | — | 75:25 | 152 | 1410 | 245 | — | 100 | 0 | 1.4 |
| PVB-d | — | — | — | 26.5 | — | — | — | — | — | 140 | 50 | 0 | 1.4 |
| PVB-e | 28.5 | 28.9 | 28.6 | — | — | 75:25 | 152 | 1410 | 245 | — | 500 | 0 | 1.3 |
| Ionomer | — | — | — | — | — | — | — | — | — | — | 50 | 0 | 1.4 |
| PVB-I | — | — | — | — | 28.8 | — | — | — | — | — | 760 | 38 | 3.3 |

In Table 2, the content of a plasticizer is an amount relative to 100 parts by mass of a resin.

Production Example 2

An ionomer resin layer was produced in the same manner as for the production of the polyvinyl butyral resin layer, except that an ionomer film ("SentryGlas(R) Interlayer", manufactured by DuPont de Nemours, Inc.) was used in place of the polyvinyl butyral resin. The thickness and surface roughness Rz of the ionomer resin layer are shown in Table 2.

Example 1

<Production of (PET Film)/(Resin Layer (1))/(Copper Foil)/(PET Film) Laminate>

A copper foil which had a thickness of 7 μm and in which one surface was blackish-finish-treated was overlaid on the polyvinyl acetal resin layer PVB-a [resin layer (1)] produced in Production Example 1 in such a direction that a blackish-finish-treated surface of the copper foil came into contact with the resin layer (1). Subsequently, a laminate produced by overlaying the resin layer (1) and the copper foil on each other was intercalated between PET films each having a thickness of 50 μm, and then the resultant product was allowed to pass between thermal press rolls set at 120° C. (pressure: 0.2 MPa, speed: 0.5 m/min) to produce a laminate in which the PET film, the resin layer (1), the copper foil and the PET film were laminated in this order.

<Production of (PET Film)/(Resin Layer (1))/(Conductive Layer)/(Resin Layer (2)) Laminate>

The PET film positioned on the copper foil side of the (PET film)/(resin layer (1))/(copper foil)/(PET film) laminate was detached, then a dry film resist was laminated on the copper foil, and then an etching-resistant pattern was formed by employing a photolithographic technique. As the pattern, a current-conducting structure pattern shown in FIG. 1 which had no auxiliary conductive fine wire was employed. Subsequently, the (PET film)/(resin layer (1))/(copper foil) laminate having the current-conducting structure pattern formed thereon was immersed in a copper etching solution to form a conductive layer, and then the remaining photoresist layer was removed by the conventional method. In this manner, a laminate in which the PET film, the resin layer (1) and the conductive layer were laminated in this order and in which the conductive layer comprised the patterned copper foil was produced. The conductive layer had such a structure that copper wires each having a line width of 5 μm were arranged in a wavy form at 2.5-mm intervals in a 6-cm square and copper wires each having a width of 5 mm and a length of 5 cm, which correspond to bus bars, were arranged at a 5-cm interval in the upper side and the lower side of the square, respectively. A polyvinyl acetal resin layer PVB-I [resin layer (2)] shown in Table 2 was overlaid on the conductive layer side of the resultant (PET film)/(resin layer (1))/(conductive layer) laminate to produce a (PET film)/(resin layer (1))/(conductive layer)/(resin layer (2)) laminate.

<Production of Heat-Generating Conductive Layer-Including Film Comprising (Resin Layer (1))/(Conductive Layer)/(Resin Layer (2)) Laminated in this Order>

The PET film was detached from the (PET film)/(resin layer (1))/(conductive layer)/(resin layer (2)) laminate to produce a heat-generating conductive layer-including film in which the resin layer (1), the conductive layer and the resin layer (2) were laminated in this order.

<Production of Laminated Glass>

The heat-generating conductive layer-including film comprising the resin layer (1), the conductive layer and the resin layer (2) laminated in this order was cut into a piece having a size of 6 cm long and 6 cm wide in such a manner that a series of conductive layer was included in the piece, and the piece was placed on a glass having a size of 10 cm long, 10 cm wide and 3 mm thick. Subsequently, an electrode (a copper foil tape having a conductive adhesive agent attached thereto) was attached to each of the bus bars (copper wires each having a width of 5 mm) respectively arranged at both end parts of the conductive layer in such a manner that a terminal of the electrode was protruded outside the glass (inorganic glass), and then a glass having a size of 10 cm long, 10 cm wide and 3 mm thick was overlaid on the resultant product.

Subsequently, the product was placed in a vacuum bag, then the pressure in the vacuum bag was reduced at room temperature for 15 minutes using a vacuum pump, then the temperature was raised to 100° C. while reducing the pressure, and then the vacuum bag was further heated for 60 minutes. After lowering the temperature, the pressure was set to ambient pressure, and then a laminated glass that had been pre-laminated was removed.

Subsequently, the laminated glass was placed in an autoclave and was then treated at 140° C. and 1.2 MPa for 30 minutes to produce a laminated glass having the glass, the resin layer (1), the conductive layer, the resin layer (2) and the glass laminated in this order.

Example 2

A laminate, a heat-generating conductive layer-including film and a laminated glass were produced in the same manner as in Example 1, except that a conductive layer having such a structure that copper wires each having a line width of 5 μm were arranged at 2.5-mm intervals in a zig-zag shape was used in place of the conductive layer having such a structure that copper wires each having a line width of 5 μm were arranged at 2.5-mm intervals in a wavy shape.

Example 3

A laminate, a heat-generating conductive layer-including film and a laminated glass were produced in the same manner as in Example 1, except that a polyvinyl acetal resin layer PVB-b shown in Table 2 was used as a resin layer (1) in place of the polyvinyl acetal resin layer PVB-a.

Example 4

A laminate, a heat-generating conductive layer-including film and a laminated glass were produced in the same manner as in Example 2, except that a polyvinyl acetal resin layer PVB-b shown in Table 2 was used as a resin layer (1) in place of the polyvinyl acetal resin layer PVB-a.

Example 5

A laminate, a heat-generating conductive layer-including film and a laminated glass were produced in the same manner as in Example 1, except that a polyvinyl acetal resin layer PVB-c shown in Table 2 was used as a resin layer (1) in place of the polyvinyl acetal resin layer PVB-a.

Example 6

A laminate, a heat-generating conductive layer-including film and a laminated glass were produced in the same manner as in Example 1, except that a polyvinyl acetal resin layer PVB-d shown in Table 2 was used as a resin layer (1) in place of the polyvinyl acetal resin layer PVB-a, and that a pattern A of which the schematic illustration was shown in FIG. 2 and in which straight line-shaped auxiliary conductive fine wires each having a line width of 5 μm were arranged respectively at positions 500 μm away from the upper side and the lower side of a square was employed as a current-conducting structure pattern. In FIG. 2, the distance between any adjacent two of the main conductive fine wires was 2.5 mm, and the distance between the auxiliary conductive fine wires that connect any adjacent two of the main conductive fine wires was 49 mm. In the pattern A, the total of the projected cross-sectional areas of the auxiliary conductive fine wires was less than 1-time the total of the projected cross-sectional areas of the main conductive fine wires.

Example 7

A laminate, a heat-generating conductive layer-including film and a laminated glass were produced in the same manner as in Example 1, except that a polyvinyl acetal resin layer PVB-d shown in Table 2 was used as a resin layer (1) in place of the polyvinyl acetal resin layer PVB-a, and that the line width of each of the main conductive fine wires was changed from 5 μm to 8 μm.

Example 8

A laminate, a heat-generating conductive layer-including film and a laminated glass were produced in the same manner as in Example 6, except that a pattern B of which the schematic illustration was shown in FIG. 3 and which had auxiliary conductive fine wires each having a line width of 5 μm was employed as a current-conducting structure pattern in place of the pattern A. In FIG. 3, the distance between any adjacent two of the main conductive fine wires was 2.5 mm, and the distance between the auxiliary conductive fine wires that connect any adjacent two of the main conductive fine wires was 7.5 mm. In the pattern B, the total of the projected cross-sectional areas of the auxiliary conductive fine wires was less than 1-time the total of the projected cross-sectional areas of the main conductive fine wires.

Example 9

A laminate, a heat-generating conductive layer-including film and a laminated glass were produced in the same manner as in Example 6, except that a pattern C of which the schematic illustration was shown in FIG. 4 and which had auxiliary conductive fine wires each having a line width of 5 μm was employed as a current-conducting structure pattern in place of the pattern A.

Example 10

A laminate, a heat-generating conductive layer-including film and a laminated glass were produced in the same manner as in Example 1, except that the ionomer resin layer (shown in Table 2) produced in Production Example 2 was used as a resin layer (1) in place of the polyvinyl acetal resin layer PVB-a, and that the temperature at which the laminate was to be passed between the thermal press rolls was changed from 120° C. to 150° C.

Example 11

<Production of (PET Film)/(Resin Layer (1))/(Conductive Layer)/(Resin Layer (2)) Laminate>

A laminate having a PET film, a resin layer (1), a conductive layer and a resin layer (2) laminated in this order was produced in the same manner as in Example 1, except that an acrylate-based resin [which was produced by mixing 100 parts by weight of BPS5296 (manufactured by Toyochem Co., Ltd.) with 2 parts by weight of ORIBAIN BHS8515 (manufactured by Toyochem Co., Ltd.) that served as a curing agent and then stirring the resultant mixture] was used as a resin layer (1) in place of the polyvinyl acetal resin layer PVB-a, and that a surface of the copper foil which was to be overlaid on the acrylate-based resin was a surface that was different from the blackish-finish-treated surface, and that PVB-a was used as a resin layer (2) in place of PVB-I.

<Production of Heat-Generating Conductive Layer-Including Film Having Conductive Layer and Resin Layer (2) Laminated in this Order>

A (PET film)/(resin layer (1))/(conductive layer)/(resin layer (2)) laminate was intercalated between PET films each having a thickness of 50 μm, then the resultant product was allowed to pass between thermal press rolls set at 120° C. (pressure: 0.2 MPa, speed: 0.5 m/min), then the PET films overlaid on the upper and lower surfaces of the laminate were detached, and then detachment was carried out at the interface between the resin layer (1) and the conductive layer. In this manner, a heat-generating conductive layer-including film having the conductive layer and the resin layer (2) laminated in this order was produced.

<Production of Laminated Glass>

A polyvinyl acetal resin layer PVB-I was laminated as a resin layer (4) on the conductive layer in the heat-generating conductive layer-including film having the conductive layer and the resin layer (2) laminated in this order to produce a (resin layer (4))/(conductive layer)/(resin layer (2)) laminate. Subsequently, a laminated glass having a glass, the resin layer (4), the conductive layer, the resin layer (2) and a glass laminated in this order was produced in the same manner as in Example 1.

Example 12

A laminate, a heat-generating conductive layer-including film and a laminated glass were produced in the same manner as in Example 11, except that the pattern A of which the schematic illustration was shown in FIG. 2 and in which auxiliary conductive fine wires each having a line width of 5 μm were arranged respectively at positions 500 μm away from the upper side and the lower side of a square was employed as a current-conducting structure pattern.

Example 13

A laminate, a heat-generating conductive layer-including film and a laminated glass were produced in the same manner as in Example 11, except that the pattern B of which the schematic illustration was shown in FIG. 3 and which had auxiliary conductive fine wires each having a line width of 5 μm was employed as a current-conducting structure pattern. In FIG. 3, the distance between any adjacent two of the main conductive fine wires was 2.5 mm, and the distance between the auxiliary conductive fine wires that connect any adjacent two of the main conductive fine wires to each other was 7.5 mm.

Comparative Example 1

A laminate having a resin layer (1), a conductive layer and a resin layer (2) laminated in this order (i.e., a heat-generating conductive layer-including film) and a laminated glass having a glass, the resin layer (1), the conductive layer, the resin layer (2) and a glass laminated in this order were produced in the same manner as in Example 1, except that a laminate composed of a polyvinyl acetal resin layer and a copper foil was produced without using a base material film and the current-conducting structure pattern was formed by employing a photolithographic technique.

Comparative Example 2

A laminate (heat-generating conductive layer-including film) and a laminated glass were produced in the same manner as in Comparative Example 1, except that the line width of each of the main conductive fine wires was changed from 5 μm to 10 μm.

Comparative Example 3

Figure 5:
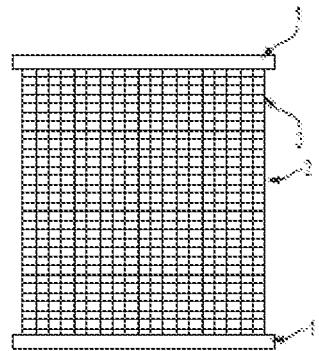
FIG. 5 is a schematic illustration showing one example of the current-conducting structure of the heat-generating conductive layer in each of the laminates produced in Comparative Examples 3 and 5.

A laminate (heat-generating conductive layer-including film) and a laminated glass were produced in the same manner as in Comparative Example 1, except that a pattern D of which the schematic illustration was shown in FIG. 5 and which had auxiliary conductive fine wires each having a line width of 5 μm was employed as a current-conducting structure pattern. In FIG. 5, the distance between any adjacent two of the main conductive fine wires was 2.5 mm, and the distance between any adjacent two of the auxiliary conductive fine wires was 2.0 mm. In the pattern D, the total of the projected cross-sectional areas of the auxiliary conductive fine wires was more than 1-time the total of the projected cross-sectional areas of the main conductive fine wires.

Comparative Example 4

A laminate (heat-generating conductive layer-including film) and a laminated glass were produced in the same manner as in Comparative Example 1, except that PVB-e was used as a polyvinyl acetal resin layer to be laminated on the copper foil in place of PVB-a.

Comparative Example 5

A laminate (heat-generating conductive layer-including film) and a laminated glass were produced in the same manner as in Comparative Example 4, except that the pattern D of which the schematic illustration was shown in FIG. 5 and which had auxiliary conductive fine wires each having a line width of 5 μm was employed as a current-conducting structure pattern. In FIG. 5, the distance between any adjacent two of the main conductive fine wires was 2.5 mm, and the distance between any adjacent two of the auxiliary conductive fine wires was 2.0 mm.

Comparative Example 6

A copper foil in which one surface was blackish-finish-treated and which had a thickness of 7 μm was overlaid on a base material PET film in such a direction that a surface different from the blackish-finish-treated surface of the copper foil came into contact with the base material PET film, then the laminate composed of the base material PET film and the copper foil overlaid on each other was intercalated between PTFE films each having a thickness of 100 μm, and then the resultant product was allowed to pass between thermal press rolls set at 150° C. (pressure: 0.2 MPa, speed: 0.5 m/min) to produce a (PTFE film)/(PET film)/(copper foil)/(PTFE film) laminate. The PTFEs were detached to produce a (PET film)/(copper foil) laminate having no detachable layer, and then a conductive layer was produced by a photolithographic technique in the same manner as in Example 1. In the resultant product, line missing was observed in a part of the current-conducting structure. Subsequently, the polyvinyl acetal resin layer PVB-a was overlaid as a resin layer (2) on the conductive layer, then the resultant laminate was intercalated between PTEF films each having a thickness of 100 μm, then the resultant product was allowed to pass between thermal press rolls set at 120° C. (pressure: 0.2 MPa, speed: 0.5 m/min), and then the PTFE films and the PET film were detached to produce a (conductive layer)/(resin layer (2)) laminate. The polyvinyl acetal resin layer PVB-I was overlaid as a resin layer (4) on the conductive layer to produce a (resin layer (2))/(conductive layer)/(resin layer (4)) laminate (i.e., a heat-generating conductive layer-including film). Subsequently, a laminated glass having a glass, the resin layer (4), the conductive layer, the resin layer (2) and a glass laminated in this order was produced in the same manner as in Example 1.

TABLE 3

| | Base material film (3) | Resin layer (1) | | Main conductive fine wires | | | Conductive layer | Thickness of conductive layer (μm) |
|---|---|---|---|---|---|---|---|---|
| | | Material | Thickness (μm) | Shape | Narrowest line width (μm) | Adjacent distance (mm) | | |
| Example 1 | PET | PVB-a | 50 | Wavy | 5 | 2.5 | Copper | 7 |
| Example 2 | PET | PVB-a | 50 | Zig-zag | 5 | 2.5 | Copper | 7 |
| Example 3 | PET | PVB-b | 25 | Wavy | 5 | 2.5 | Copper | 7 |
| Example 4 | PET | PVB-b | 25 | Zig-zag | 5 | 2.5 | Copper | 7 |
| Example 5 | PET | PVB-c | 100 | Wavy | 5 | 2.5 | Copper | 7 |
| Example 6 | PET | PVB-d | 50 | Wavy | 5 | 2.5 | Copper | 7 |
| Example 7 | PET | PVB-d | 50 | Wavy | 8 | 2.5 | Copper | 7 |
| Example 8 | PET | PVB-d | 50 | Wavy | 5 | 2.5 | Copper | 7 |
| Example 9 | PET | PVB-d | 50 | Straight line-like | 5 | | Copper | 7 |
| Example 10 | PET | Ionomer | 50 | Wavy | 5 | 2.5 | Copper | 7 |
| Example 11 | PET | Acrylate-based resin | 15 | Wavy | 5 | 2.5 | Copper | 7 |
| Example 12 | PET | Acrylate-based resin | 15 | Wavy | 5 | 2.5 | Copper | 7 |
| Example 13 | PET | Acrylate-based resin | 15 | Wavy | 5 | 2.5 | Copper | 7 |
| Comparative Example 1 | — | PVB-a | 50 | Wavy | — | 2.5 | Copper | 7 |
| Comparative Example 2 | — | PVB-a | 50 | Wavy | 10 | 2.5 | Copper | 7 |
| Comparative Example 3 | — | PVB-a | 50 | Wavy | 5 | 2.5 | Copper | 7 |

TABLE 3-continued

| | | | | | | | | | |
|---|---|---|---|---|---|---|---|---|---|
| Comparative Example 4 | — | PVB-e | 500 | Wavy | 5 | 2.5 | Copper | 7 | |
| Comparative Example 5 | — | PVB-e | 500 | Wavy | 5 | 2.5 | Copper | 7 | |
| Comparative Example 6 | PET | — | — | Wavy | 5 | 2.5 | Copper | 7 | |

| | Auxilary conductive fine wires | | | Total of projected cross-sectional areas of auxilary conductive fine wires/total of projected cross-sectional areas of main conductive fine wires | Appearance of conductive layer after etching (appearance of conductive layer in laminate) |
|---|---|---|---|---|---|
| | Pattern | Line width (μm) | Adjacent distance (mm) | | |
| Example 1 | — | — | — | — | A |
| Example 2 | — | — | — | — | A |
| Example 3 | — | — | — | — | A |
| Example 4 | — | — | — | — | A |
| Example 5 | — | — | — | — | A |
| Example 6 | A | 5 | 49 | <1.0 | A |
| Example 7 | — | — | — | — | A |
| Example 8 | B | 5 | 7.5 | <1.0 | A |
| Example 9 | C | — | — | — | A |
| Example 10 | — | — | — | — | A |
| Example 11 | — | — | — | — | A |
| Example 12 | A | 5 | 49 | <1.0 | A |
| Example 13 | B | 5 | 7.5 | <1.0 | A |
| Comparative Example 1 | — | — | — | — | C |
| Comparative Example 2 | — | — | — | — | C |
| Comparative Example 3 | D | 5 | 2 | >1.0 | B |
| Comparative Example 4 | — | — | — | — | B |
| Comparative Example 5 | D | 5 | 2 | >1.0 | B |
| Comparative Example 6 | — | — | — | — | D |

TABLE 4

| | Resin layer (2) | Resin layer (4) | Total thickness of layer/layers having PVB layer (μm) | Shortest distance from inside surface of glass to conductive layer (μm) | Appearance of conductive layer after treatment with autoclave (appearance of conductive layer in laminated glass) | Haze value | Heat-generating |
|---|---|---|---|---|---|---|---|
| Example 1 | PVB-I | — | 810 | 50 | A | 1.0 | A |
| Example 2 | PVB-I | — | 810 | 50 | A | 1.1 | A |
| Example 3 | PVB-I | — | 785 | 25 | A | 1.0 | A |
| Example 4 | PVB-I | — | 785 | 25 | A | 1.1 | A |
| Example 5 | PVB-I | — | 860 | 100 | A | 1.1 | A |
| Example 6 | PVB-I | — | 810 | 50 | A | 1.0 | A |
| Example 7 | PVB-I | — | 810 | 50 | A | 1.4 | A |
| Example 8 | PVB-I | — | 810 | 50 | A | 1.3 | A |
| Example 9 | PVB-I | — | 810 | 50 | B | 1.1 | A |
| Example 10 | PVB-I | — | 810* | 50 | A | 1.0 | A |
| Example 11 | PVB-a | PVB-I | 810 | 50 | A | 1.0 | A |
| Example 12 | PVB-a | PVB-I | 810 | 50 | A | 1.1 | A |
| Example 13 | PVB-a | PVB-I | 810 | 50 | A | 1.3 | A |
| Comparative Example 1 | PVB-I | — | 810 | 50 | C | 1.2 | B |
| Comparative Example 2 | PVB-I | — | 810 | 50 | C | 1.7 | A |
| Comparative Example 3 | PVB-I | — | 810 | 50 | B | 2.4 | A |
| Comparative Example 4 | PVB-I | — | 1260 | 500 | B | 1.3 | B |

TABLE 4-continued

| | Resin layer (2) | Resin layer (4) | Total thickness of layer/layers having PVB layer (μm) | Shortest distance from inside surface of glass to conductive layer (μm) | Appearance of conductive layer after treatment with autoclave (appearance of conductive layer in laminated glass) | Haze value | Heat-generating |
|---|---|---|---|---|---|---|---|
| Comparative Example 5 | PVB-I | — | 1260 | 500 | B | 2.3 | C |
| Comparative Example | PVB-a | PVB-I | 810 | 50 | D | 1.0 | C |

*In Example 10, the total thickness of layer/layers including a PVB layer includes the thickness of a layer containing an ionomer.

It was confirmed that each of the laminates produced in Examples 1 to 13 did not undergo the deformation, disconnection or detachment of a conductive layer, had excellent heat-generating properties after being formed into a laminated glass, and also had a small haze value and excellent visibility. In addition, in each of the laminated glasses produced in Examples 1 to 8 and 10 to 13, the deformation, disconnection or detachment of a conductive layer did not occur. In contrast, in each of the laminates produced in Comparative Examples 1 to 6, at least one of the deformation, disconnection and detachment of a conductive layer occurred and a satisfactory result was not obtained with respect to at least one of a haze value and heat-generating properties after being formed into a laminated glass. In addition, in each of the laminated glasses produced in Comparative Examples 1 to 6, at least one of the deformation, disconnection and detachment of a conductive layer occurred.

DESCRIPTION OF REFERENCE SIGNS

1: Main bus bar
2: Main conductive fine wire
3: Auxiliary conductive fine wire
4: Regions respectively contacting with two main bus bars
5: Other eight regions
20: Projected cross-sectional areas of main conductive fine wires
30: Projected cross-sectional areas of auxiliary conductive fine wires

The invention claimed is:

1. A laminate comprising a base material film, a resin layer (1) having a detachable surface, and a heat-generating conductive layer in this order,
wherein the base material film comprises a polyethylene terephthalate resin,
wherein the heat-generating conductive layer comprises two main bus bars and a plurality of main conductive wires connected to the two main bus bars,
wherein the heat-generating conductive layer further comprises an auxiliary conductive wire connecting the main conductive wires, and
when an area between the two main bus bars is divided into ten regions at positions at which the length of each of the main conductive wires is divided into ten equal parts, a total of the projected cross-sectional areas of the auxiliary conductive wire in each of regions respectively contacting with the two main bus bars is larger than that in each of the remaining eight regions.

2. The laminate according to claim 1, wherein the laminate further comprises a resin layer (2), and the base material film, the resin layer (1) having a detachable surface, the heat-generating conductive layer and the resin layer (2) are arranged in this order.

3. The laminate according to claim 2, wherein the resin layer (2) contains at least one resin selected from the group consisting of a polyvinyl acetal resin, an ionomer resin and an ethylene-(vinyl acetate) copolymer resin.

4. The laminate according to claim 3, wherein the resin layer (2) contains a polyvinyl acetal resin, and the content of a plasticizer in the resin layer (2) is 0 part by mass or more and less than 20 parts by mass relative to 100 parts by mass of the polyvinyl acetal resin.

5. The laminate according to claim 3, wherein the resin layer (2) contains a polyvinyl acetal resin and contains a plasticizer in an amount of 20 parts by mass or more relative to 100 parts by mass of the polyvinyl acetal resin.

6. The laminate according to claim 2, wherein the resin layer (2) has a thick-ness of less than 200 μm.

7. The laminate according to claim 1, wherein the heat-generating conductive layer comprises copper.

8. The laminate according to claim 1, wherein each of the main conductive wires is wholly or partly formed in a wavy shape and/or a zig-zag shape.

9. The laminate according to claim 1, wherein the heat-generating conductive layer further comprises an auxiliary conductive wire that connect the main conductive wires, and a total of the projected cross-sectional areas of the auxiliary conductive wire is less than 1-time a total of the projected cross-sectional areas of the main conductive wires on a projected cross-sectional area of the heat-generating conductive layer which is projected from the surface of the laminate.

10. The laminate according to claim 1, wherein the number of the main conductive fine wires each having a part having a line width of 20 μm or less is 80% or more of the number of all of the main conductive fine wires.

11. The laminate according to claim 1, wherein the thickness of the resin layer (1) having a detachable surface is less than 200 μm.

12. The laminate according to claim 1, wherein the resin layer (1) having a detachable surface contains a polyvinyl acetal resin.

13. The laminate according to claim 12, wherein the content of a plasticizer in the resin layer (1) having a detachable surface is 0 part by mass or more and less than 20 parts by mass relative to 100 parts by mass of the polyvinyl acetal resin.

14. The laminate according to claim 12, wherein the surface roughness Rz of the resin layer (1) having a detachable surface on a heat-generating conductive layer-laminating side thereof is less than 5 μm before the lamination of the heat-generating conductive layer.

* * * * *